(12) United States Patent
Hayashi

(10) Patent No.: US 10,744,575 B2
(45) Date of Patent: Aug. 18, 2020

(54) TIP AND DRILL

(71) Applicant: KYOCERA CORPORATION, Kyoto-shi, Kyoto (JP)

(72) Inventor: Katsura Hayashi, Moriyama (JP)

(73) Assignee: KYOCERA CORPORATION, Kyoto-shi, Kyoto (JP)

( * ) Notice: Subject to any disclaimer, the term of this patent is extended or adjusted under 35 U.S.C. 154(b) by 39 days.

(21) Appl. No.: 16/089,382

(22) PCT Filed: Mar. 27, 2017

(86) PCT No.: PCT/JP2017/012402
§ 371 (c)(1),
(2) Date: Sep. 28, 2018

(87) PCT Pub. No.: WO2017/170407
PCT Pub. Date: Oct. 5, 2017

(65) Prior Publication Data
US 2019/0381584 A1 Dec. 19, 2019

(30) Foreign Application Priority Data

Mar. 29, 2016 (JP) .................. 2016-065004

(51) Int. Cl.
*B23B 51/02* (2006.01)
*B23C 5/10* (2006.01)

(52) U.S. Cl.
CPC ................ *B23C 5/10* (2013.01); *B23B 51/02* (2013.01); *B23B 2251/02* (2013.01); *B23C 2210/02* (2013.01)

(58) Field of Classification Search
CPC ......... B23C 1/00; B23C 2210/02; B23C 5/10; B23C 5/26; B23B 29/046; B23B 29/04; B23B 29/20; B23B 31/1071
See application file for complete search history.

(56) References Cited

U.S. PATENT DOCUMENTS

| | | | | |
|---|---|---|---|---|
| 1,083,747 A | * | 1/1914 | Kocher | ......................... 408/233 |
| 4,604,010 A | * | 8/1986 | Reeves | ................. B23B 31/006 409/233 |
| 4,826,364 A | * | 5/1989 | Grunsky | ................. B23B 51/06 408/59 |
| 5,169,183 A | * | 12/1992 | Hallez | ................... E21B 17/042 285/334 |
| 5,541,006 A | | 7/1996 | Conley | |

(Continued)

FOREIGN PATENT DOCUMENTS

| | | |
|---|---|---|
| JP | H10-511432 A | 11/1998 |
| JP | 2003501279 A | 1/2003 |
| WO | 2009084081 A1 | 7/2009 |

*Primary Examiner* — Nicole N Ramos
(74) *Attorney, Agent, or Firm* — Viering, Jentschura & Partner MBB

(57) ABSTRACT

A drill tip may include a first part and a second part. The first part includes a cutting edge located at a side of a first end, and a recess located at a side of a second end, where the first end is one side of a central axis and the second end is another side of the central axis. The second part includes a shank portion extending along the central axis, and an engaging portion which connects to the shank portion at a side of the first end and includes a diameter greater than the shank portion. The engaging portion is located in the recess.

8 Claims, 26 Drawing Sheets

(56) References Cited

U.S. PATENT DOCUMENTS

| | | | |
|---|---|---|---|
| 8,408,848 B2* | 4/2013 | Hecht | B23B 27/143 |
| | | | 407/114 |
| 2002/0081164 A1 | 6/2002 | Pokolm | |
| 2003/0072628 A1* | 4/2003 | Yamamoto | B23B 27/007 |
| | | | 408/226 |
| 2006/0073744 A1* | 4/2006 | Jonsson | B23B 31/11 |
| | | | 439/884 |
| 2009/0010709 A1* | 1/2009 | Berglow | B23B 31/11 |
| | | | 403/343 |
| 2009/0142150 A1* | 6/2009 | Chu | B23C 5/10 |
| | | | 408/59 |
| 2010/0290845 A1 | 11/2010 | Shimoda et al. | |
| 2015/0056463 A1* | 2/2015 | Jansson | C04B 37/006 |
| | | | 428/548 |
| 2019/0118274 A1* | 4/2019 | Kawasaki | B23B 31/11 |

* cited by examiner

TIP AND DRILL

CROSS-REFERENCE TO RELATED APPLICATIONS

This application is a national stage entry according to 35 U.S.C. 371 of PCT Application No. PCT/JP2017/012402 filed on Mar. 27, 2017, which claims priority to Japanese Application No. 2016-065004 filed on Mar. 29, 2016, which are entirely incorporated herein by reference.

TECHNICAL FIELD

The present disclosure relate to tips for drills. The drills are used, for example, in a drilling process.

BACKGROUND

A tip described in Japanese Unexamined Patent Publication No. 10-511432 (Patent Document 1) may be a tip for use in the drilling process of metal or the like. The tip illustrated in FIG. 2A of Patent Document 1 has a first region and a second region which are different from each other in composition. The second region includes a cutting edge. The first region and the second region are metallurgically bonded together.

In the tip described in Patent Document 1, the first region has a columnar shape, and the second region is located so as to cover a front end side of the first region. Because the first region differs from the second region in composition, cracks may occur at boundaries between the first region and the second region, and durability of the tip may be lowered.

The present embodiments may provide tips having good durability.

SUMMARY

A tip may include a first part and a second part. The first part includes a cutting edge located at a side of a first end, and a recess located at a side of a second end, where the first end is one side of a central axis and the second end is another side of the central axis. The second part includes a shank portion extending along the central axis, and an engaging portion which connects to the shank portion at a side of the first end and includes a diameter greater than the shank portion. The engaging portion is located in the recess.

DETAILED DESCRIPTION

<Drill>

Figure 1:
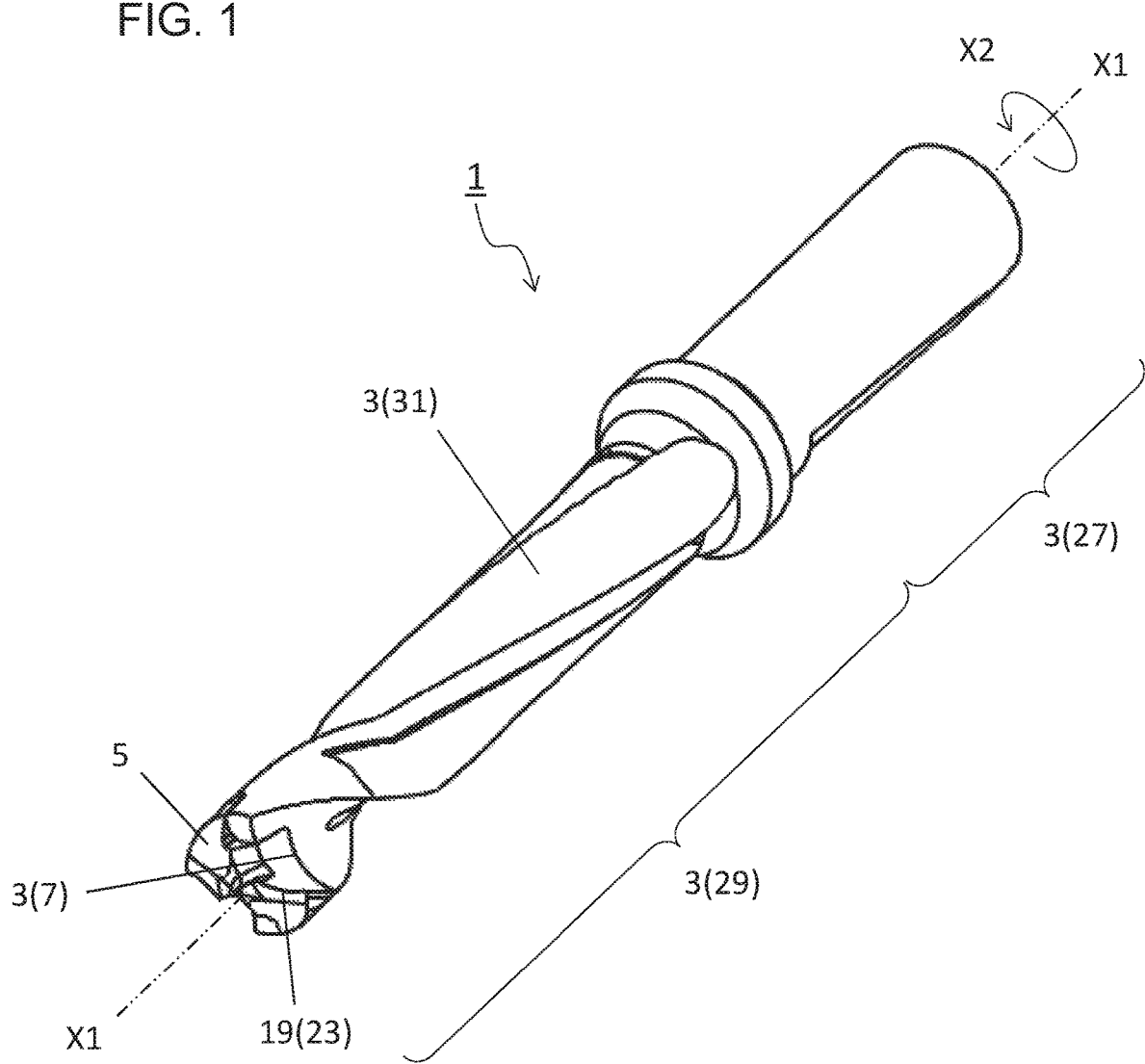
FIG. 1 is a perspective view illustrating a drill in a non-limiting aspect of the disclosure.
Figure 2:
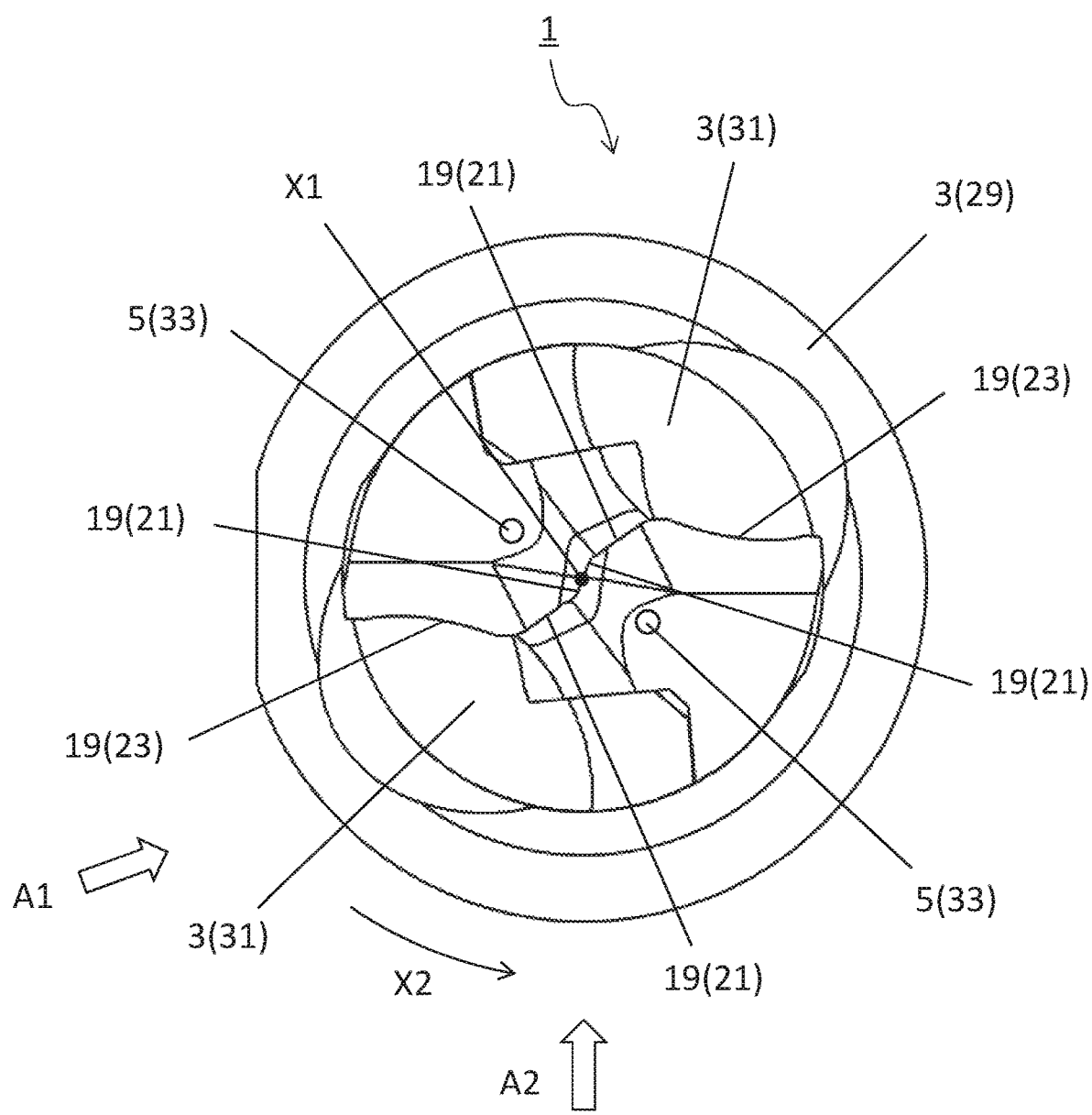
FIG. 2 is a front view as viewed toward a first end of the drill illustrated in FIG. 1.
Figure 3:
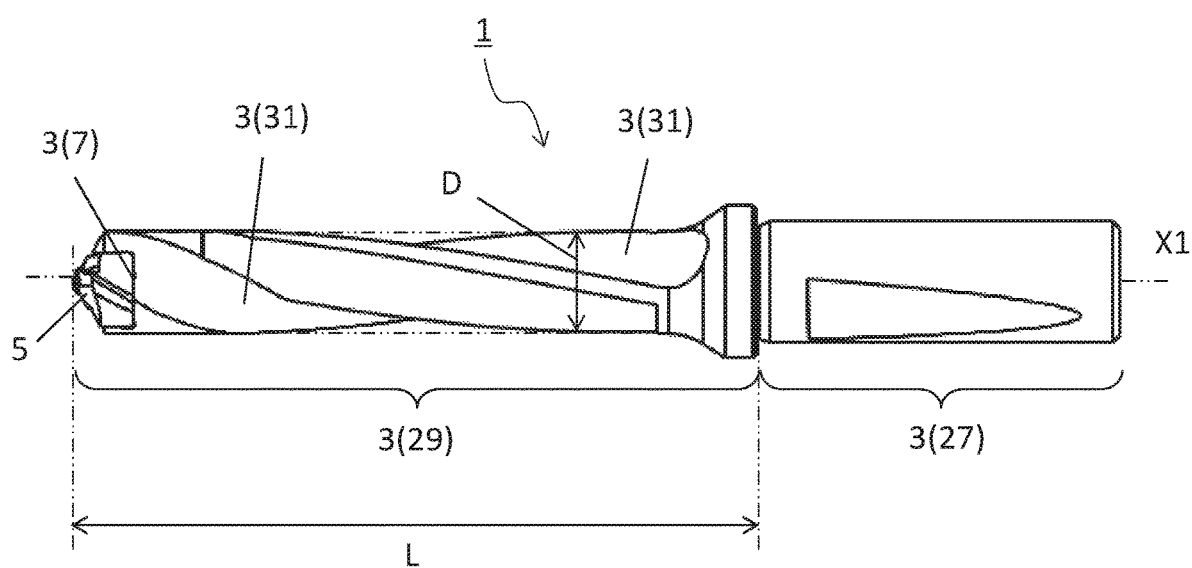
FIG. 3 is a side view when the drill illustrated in FIG. 2 is viewed from A1 direction.
Figure 4:
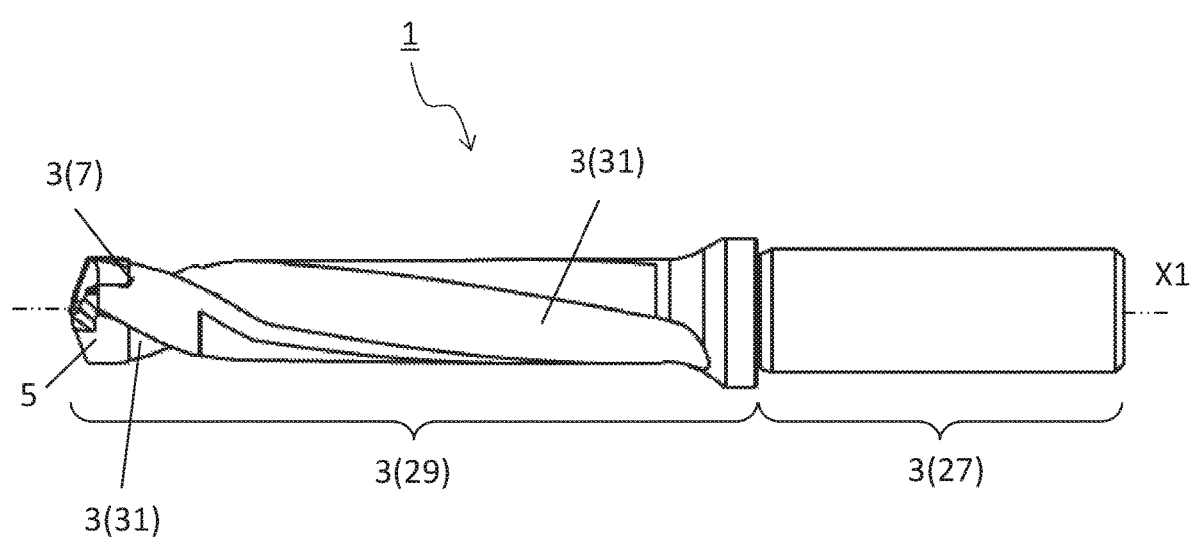
FIG. 4 is a side view when the drill illustrated in FIG. 2 is viewed from A2 direction.

A tip for a drill (hereinafter also referred to simply as "a tip") and a drill in a non-limiting aspect of the disclosure are described in detail below with reference to the drawings. For the sake of description, the drawings referred to in the following illustrate, in a simplified form, only main members necessary for describing various aspects of the disclosure. The tip and the drill to be disclosed in the following are therefore capable of including any structural member not illustrated in the drawings referred to. Sizes of the members in each of the drawings are not ones which faithfully represent sizes of actual structural members and size ratios of these members.

As illustrated in FIGS. 1 to 4, the drill 1 of the present non-limiting aspect of the disclosure includes a holder 3 and a tip 5. For example, the holder 3 has a bar shape extending thin and long along a rotation axis X1, and includes a pocket 7 located at a side of a first end as illustrated in FIG. 1. The holder 3 in the present non-limiting aspect of the disclosure includes the single pocket 7. The drill 1 is rotatable around the rotation axis X1 during a process of cutting out a workpiece in order to manufacture a machined product. Arrow X2 in FIG. 1 and the like indicates a rotation direction of the drill 1.

Here, for the sake of convenience, one side in a direction along the rotation axis X1 is referred to as "a first end," and the other side in the direction along the rotation axis X1 is referred to as "a second end." A side of one end portion in a target member is referred to as "a side of a first end," and a side of the other end portion in the target member is referred to as "a side of a second end." In general, the first end is called "a front end," and the second end is called "a rear end."

The pocket 7 is a portion to which the tip 5 is attached, and which opens into a side of a first end of the holder 3. The tip 5 is located at the pocket 7 in the present non-limiting aspect of the disclosure. The tip 5 may directly be in contact with the pocket 7. Alternatively, a not particularly illustrated sheet may be held between the tip 5 and the pocket 7. The tip 5 is attachable and detachable with respect to the holder 3.

The tip 5 constituting the drill 1 is described in detail below.

Figure 5:
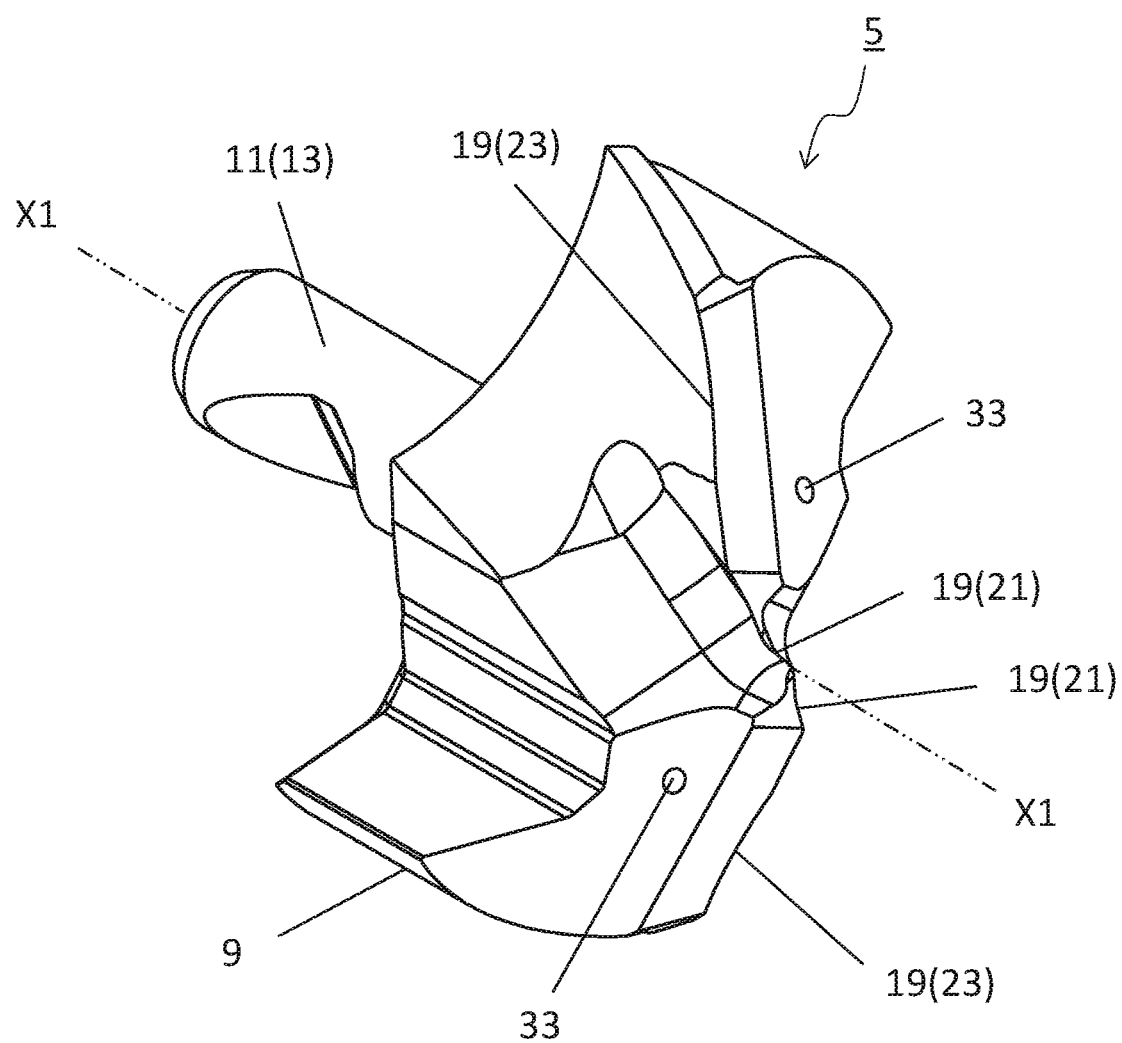
FIG. 5 is a perspective view illustrating a tip in a non-limiting aspect of the disclosure.
Figure 6:
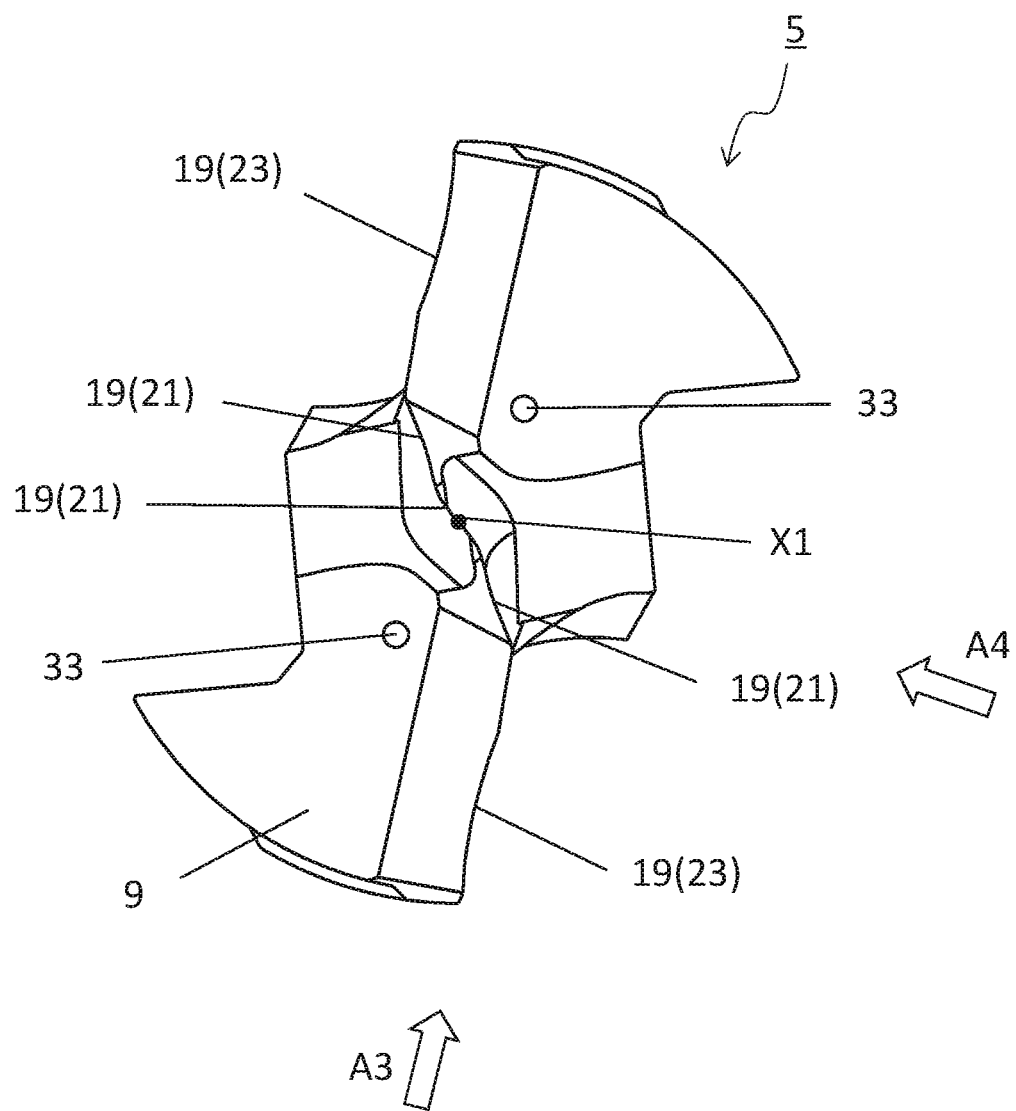
FIG. 6 is a front view as viewed toward a first end of the tip illustrated in FIG. 5.
Figure 8:
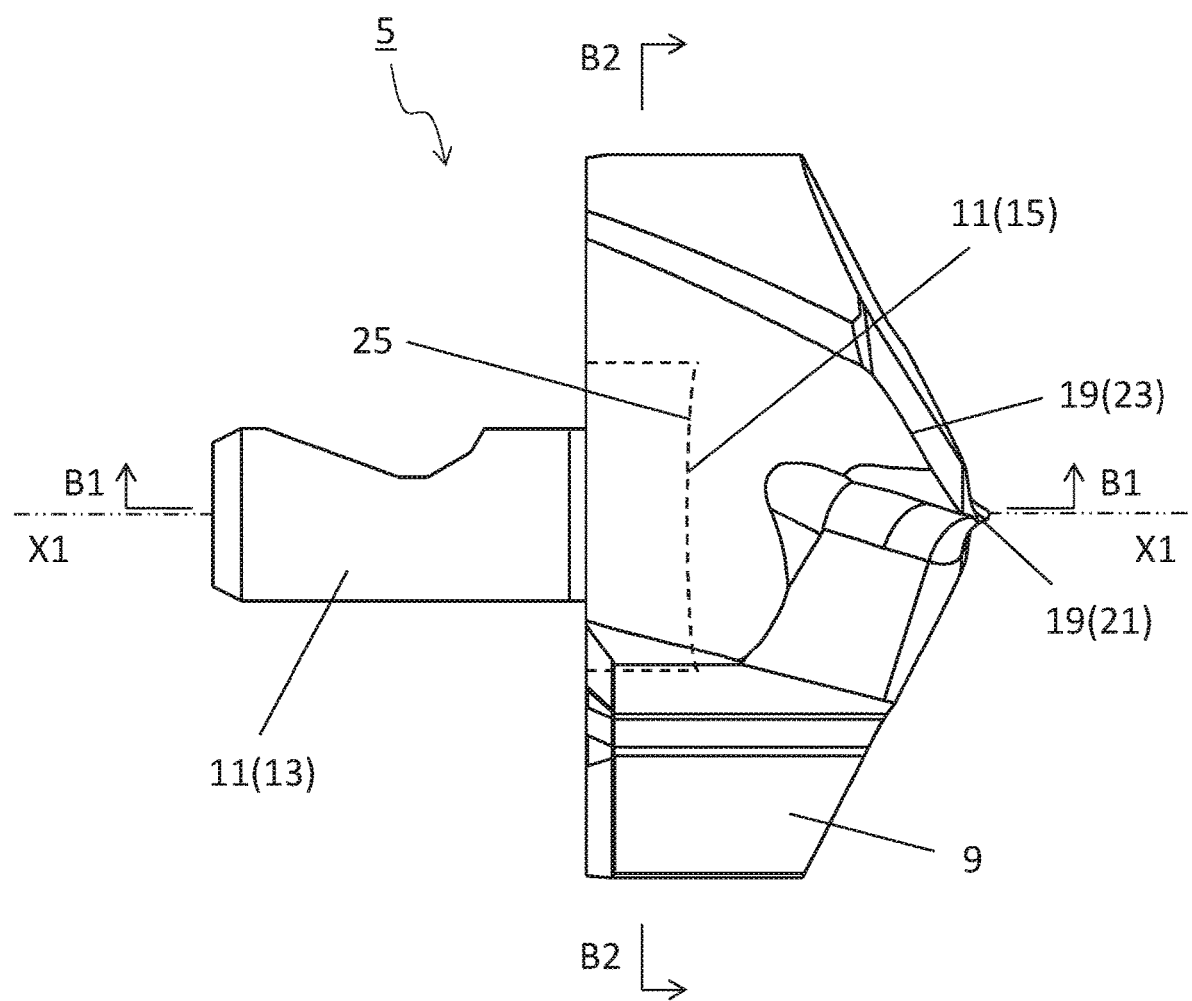
FIG. 8 is a side view when the tip illustrated in FIG. 6 is viewed from A3 direction.

The tip 5 functions as a cutting part in the drill 1. Specifically, the tip 5 is a portion which is brought into contact with a workpiece and has a major role in a cutting process of a workpiece. As illustrated in FIG. 5, the tip 5 in the present non-limiting aspect of the disclosure is composed of two parts of a first part 9 and a second part 11. The second part 11 includes a shank portion 13 and an engaging portion 15 as illustrated in FIG. 8 and the like. The shank portion 13 extends along a central axis of the tip 5 and has, for example, a bar shape in the present non-limiting aspect of the disclosure as illustrated in FIG. 8.

Although the central axis of the tip 5 need not necessarily coincide with the rotation axis X1 of the holder 3, these two axes coincide in the present non-limiting aspect of the disclosure. Therefore, alphanumeric character "X1" is used to indicate the rotation axis and the central axis in the following description related to the present non-limiting aspect of the disclosure.

The pocket 7 of the holder 3 in the present non-limiting aspect of the disclosure includes a hole (not illustrated) corresponding to the shank portion 13. Positioning of the tip 5 around the central axis X1 with respect to the holder 3 is established by insertion of the shank portion 13 into the hole.

The engaging portion 15 of the second part 11 is located closer to a side of a first end than the shank portion 13, and is continuous with the shank portion 13. The engaging portion 15 in the present non-limiting aspect of the disclosure includes a diameter greater than the shank portion 13. Therefore, the second part 11 has a T-shape in a side view. The term "diameter" denotes a maximum value of width in a direction orthogonal to the central axis X1.

Figure 9:
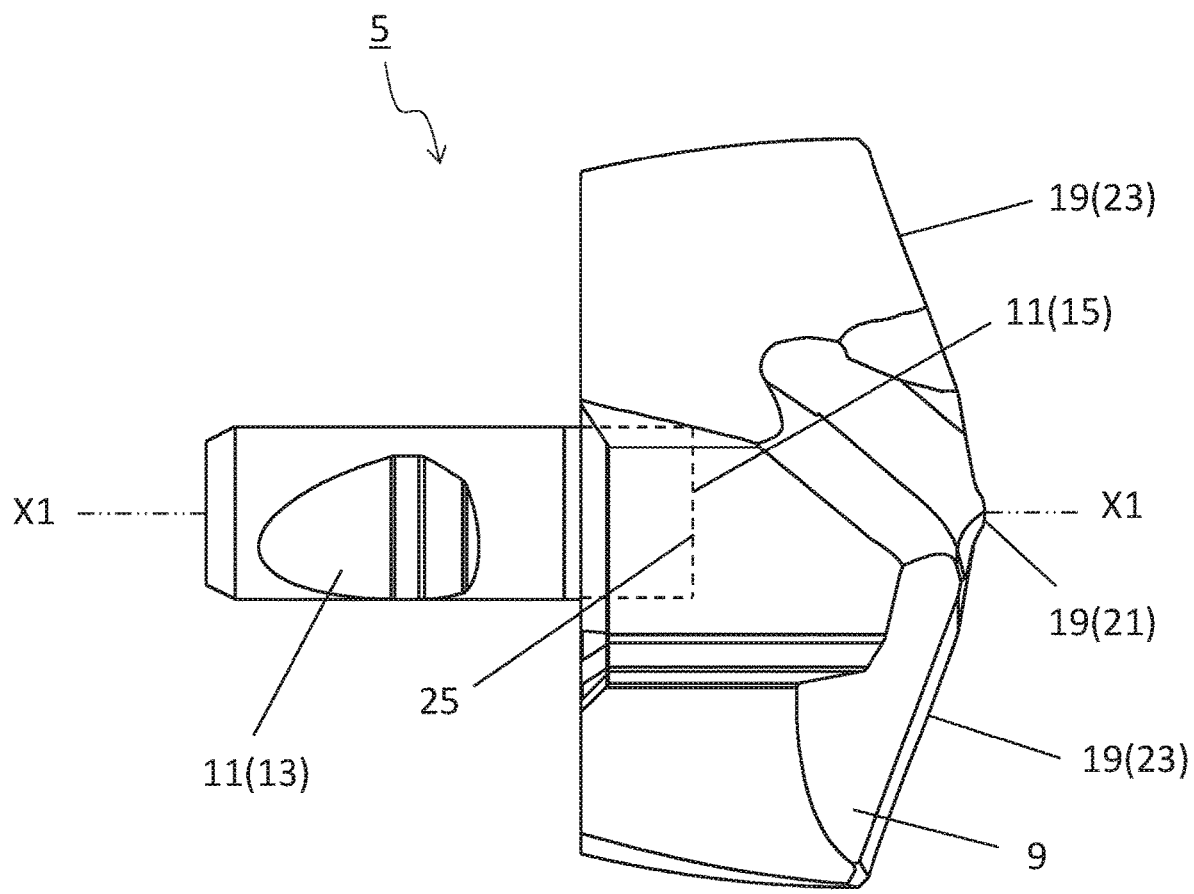
FIG. 9 is a side view when the tip illustrated in FIG. 6 is viewed from A4 direction.

The engaging portion 15 in the present non-limiting aspect of the disclosure extends in the direction orthogonal to the central axis X1. Therefore, the engaging portion 15 has a greater width in the direction orthogonal to the central axis X1 than the shank portion 13 as viewed from a direction illustrated in FIG. 8. The shank portion 13 and the engaging portion 15 have the same width in the direction orthogonal to the central axis X1 as viewed from a direction illustrated in FIG. 9.

The shank portion 13 and the engaging portion 15 in the present non-limiting aspect of the disclosure have approximately the same composition, and are integrally formed. The term "approximately the same" does not require that compositions of two regions are strictly the same every time the compositions are measured, but denotes that variations of approximately measurement error is allowable.

The first part 9 is located at a side of a first end with respect to the second part 11. A cutting edge 19 is located at a side of the first end in the first part 9. A recess 25 is located at a side of a second end in the first part 9.

The cutting edge 19 is formed at the first end in the first part 9. The cutting edge 19 passes through the central axis X1 as viewed from a side of the first end, and has a 180° rotationally symmetric shape on the basis of the central axis X1. The cutting edge 19 in the present non-limiting aspect of the disclosure includes a first cutting edge 21 and a pair of second cutting edges 23. The second cutting edges 23 respectively connect to end portions of the first cutting edge 21. Accordingly, the cutting edge 19 is provided with one of the second cutting edge 23, the first cutting edge 21, and the other of the second cutting edge 23 which are arranged in this order.

The first cutting edge 21 is a portion which passes through the central axis X1 as viewed toward the first end, and which is generally called "a chisel edge." The pair of second cutting edges 23 are portions which respectively connect to the end portions of the first edge 21, and which are so-called "major cutting edges" that mainly cut out a workpiece during a cutting process.

The pair of second cutting edges 23 used as the major cutting edge are formed along a ridge that is an intersection of two surfaces. Here, one of the two surfaces which is located at a side of the first end is a so-called "flank surface," and the other located at a side of the second end is a so-called "rake surface." Therefore, it can also be said that the major cutting edge is formed along the ridge that is an intersection of the flank surface and the rake surface. Chips of a workpiece cut out by the major cutting edge flow along the rake surface. Because the present non-limiting aspect of the disclosure includes the two major cutting edges, there are also the two rake surfaces.

Although the configuration including the first cutting edge 21 and the pair of second cutting edges 23 is exemplified above as a specific configuration of the cutting edge 19, the cutting edge 19 is not limited to the above configuration.

An end surface at a side of the second end in the first part 9 has a flat surface shape. The recess 25 is located in the end surface. The engaging portion 15 of the second part 11 is located in the recess 25, and the second part 11 is in contact with the first part 9 in the recess 25 in the present non-limiting aspect of the disclosure. The second part 11 and the first part 9 may be joined together in the recess 25 in the present non-limiting aspect of the disclosure.

The term "joined together" is not limited to the case of bonding two parts with an adhesive, such as solder and a resin, but is such a concept that also includes the cases of directly joining the two parts together, such as the case of welding the two parts together, and the case of depositing the two parts.

The first part 9 may be deposited onto the second part 11 in the present non-limiting aspect of the disclosure. When the first part 9 is deposited onto the second part 11, it is possible to strongly join the second part 11 and the first part 9 together. Additionally, because there is no need to use an adhesive, it is possible to decrease the number of members for manufacturing the drill 1.

When a drilling process is carried out using the drill 1 including the tip 5 composed of a plurality of parts, a load is also applied onto boundaries among the plurality of parts, and cracks may occur at the boundaries of these parts, thus causing damage to the drill 1.

However, when the engaging portion 15 includes a diameter greater than the shank portion 13 and the engaging portion 15 is joined to the first part 9 in the recess 25 in the tip 5 in the drill 1 of the present non-limiting aspect of the disclosure, a large joining area of the second part 11 and the first part 9 is ensured. The boundaries between the second part 11 and the first part 9 are therefore less prone to cracking, thus leading to improved durability of the tip 5.

Examples of material constituting the second part 11 include metal, cemented carbide, and cermet. Examples of the metal include stainless steel and titanium. Examples of composition of the cemented carbide include WC (tungsten carbide)-Co (cobalt), WC—TiC (titanium carbide)-Co, and WC—TiC—TaC (tantalum carbide)-Co.

Here, WC, TiC, and TaC are hard particles, and Co is a binder phase. The cermet is a sintered composite material obtained by compositing metal into a ceramic ingredient. A specific example of the cermet is one which is composed mainly of a titanium compound, such as TiC (titanium carbide) and TiN (titanium nitride).

Examples of materials constituting the first part 9 include diamond sintered body, CBN (Cubic Boron Nitride), cemented carbide, and cermet. Examples of usable cemented carbide and cermet include the same ones as described as the material constituting the second part 11.

The same material or different materials may be used as the material constituting each of the second part 11 and the first part 9. For example, the second part 11 may be composed of metal, such as titanium, and the first part 9 including the cutting edge 19 located at the side of the first end may be composed of cemented carbide.

When the entirety of the engaging portion 15 is located in the recess 25 and an end surface of the engaging portion 15 which is located at a side of the second end is compared with an end surface of the first part 9 which is located at a side of the second end in the present non-limiting aspect of the disclosure, positions of the two end surfaces in a direction along the rotation axis are approximately the same. In other words, the end surface of the engaging portion 15 which is located at the side of the second end, and the end surface of the first part 9 which is located at the side of the second end are located on the same flat surface. However, there is no intention to limit to this aspect of the disclosure.

Figure 12:
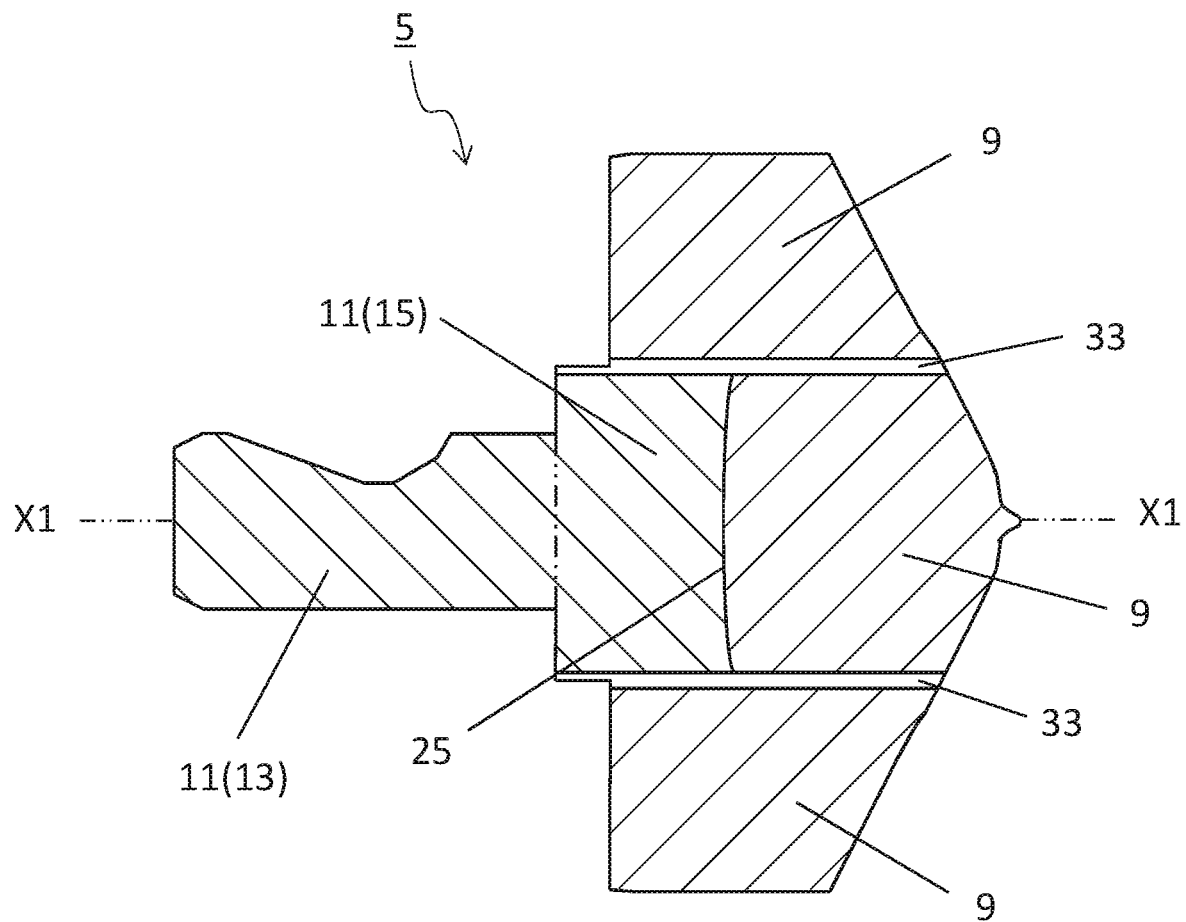
FIG. 12 is a sectional view of a non-limiting aspect of the disclosure of the tip illustrated in FIG. 10.

The engaging portion 15 needs to be at least partially located in the recess 25. A part of the engaging portion 15 which is located at a side of the second end may protrude from the recess 25 as illustrated in FIG. 12. Alternatively, the engaging portion 15 may be located closer to the side of the first end than the end surface at the side of the second end in the first part 9 as illustrated in FIG. 13.

Figure 13:
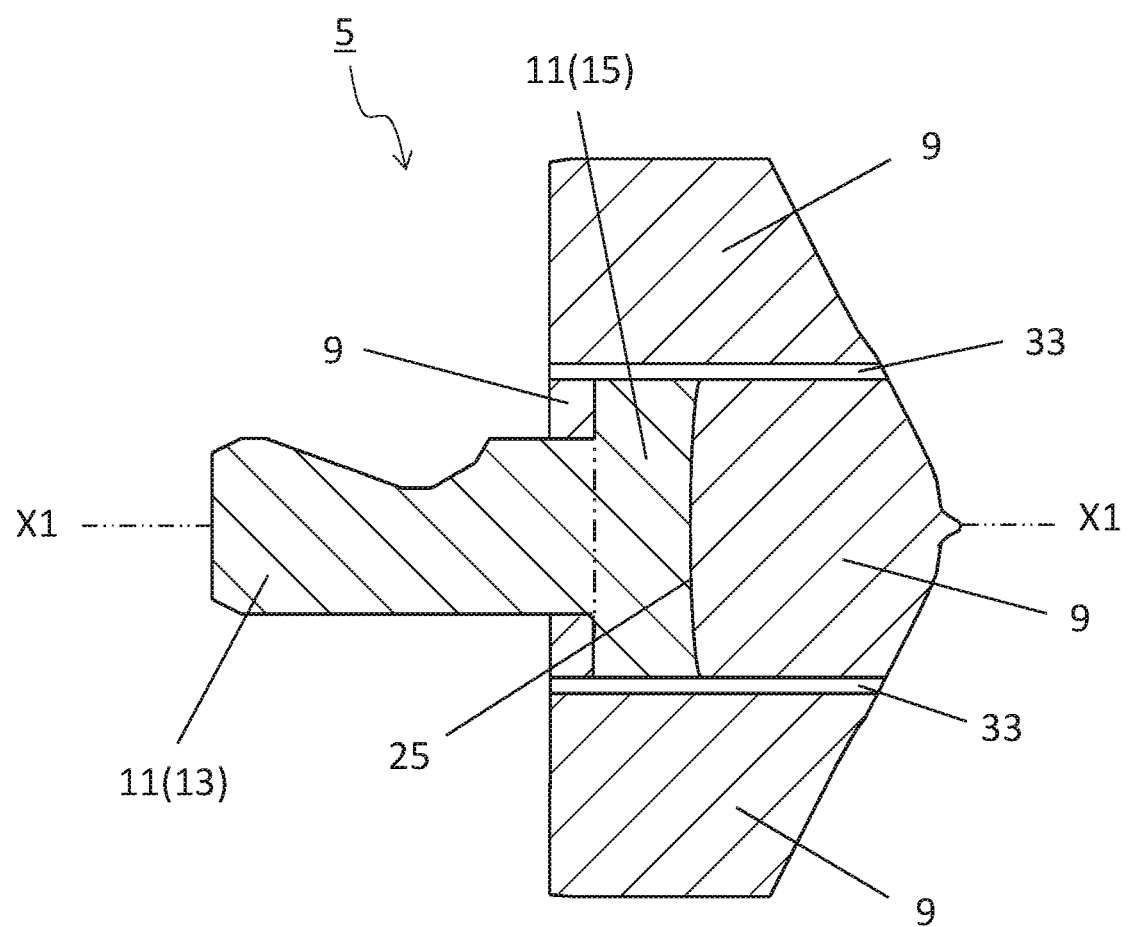
FIG. 13 is a sectional view of a non-limiting aspect of the disclosure of the tip illustrated in FIG. 10.

Here, at least a part of the end surface at the side of the second end in the engaging portion 15 may be in contact with the first part 9 as illustrated in FIG. 13. In other words, an inner diameter of a part of the recess 25 which is located at a side of the second end may be smaller than an outer diameter of the engaging portion 15.

When the inner diameter of the part of the recess 25 which is located at the side of the second end is smaller than the outer diameter of the engaging portion 15, even if the first part 9 separates from the second part 11 due to cracks occurred at boundaries between the second part 11 and the first part 9, the engaging portion 15 in the second part 11 is caught by the recess 25 in the first part 9, thereby suppressing the second part 11 from slipping out of the first part 9.

Figure 14:
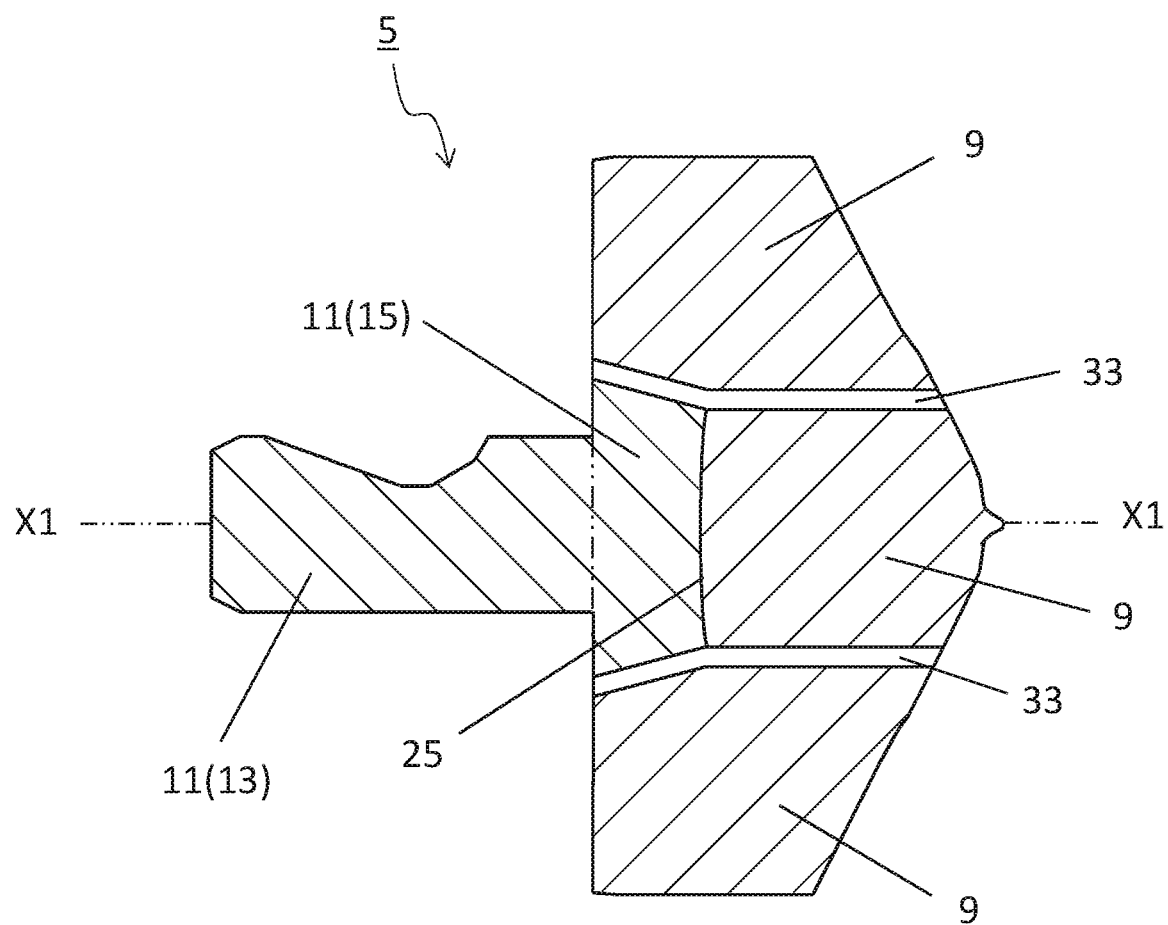
FIG. 14 is a back view of a non-limiting aspect of the disclosure of the tip illustrated in FIG. 10.

As illustrated in FIG. 14, a width of the engaging portion 15 in a direction orthogonal to the central axis X1 may decrease as approaching a side of the first end. When the engaging portion 15 is so configured, a thickness of the first part 9 between an outer peripheral surface of the engaging portion 15 and the cutting edge 19 can be ensured, thus leading to enhanced durability of the tip 5. When the second part 11 and the first part 9 are bonded together with an adhesive, it is easy to join these parts together.

Figure 15:
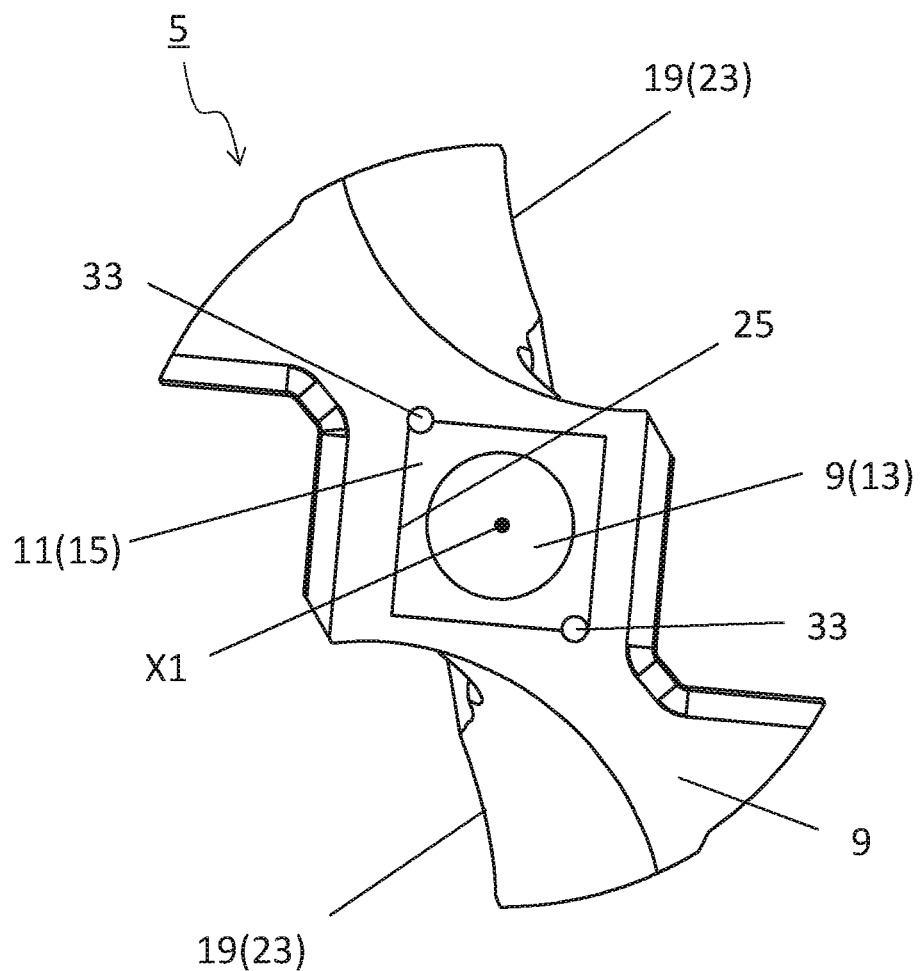
FIG. 15 is a back view of a non-limiting aspect of the disclosure of the tip illustrated in FIG. 7.
Figure 16:
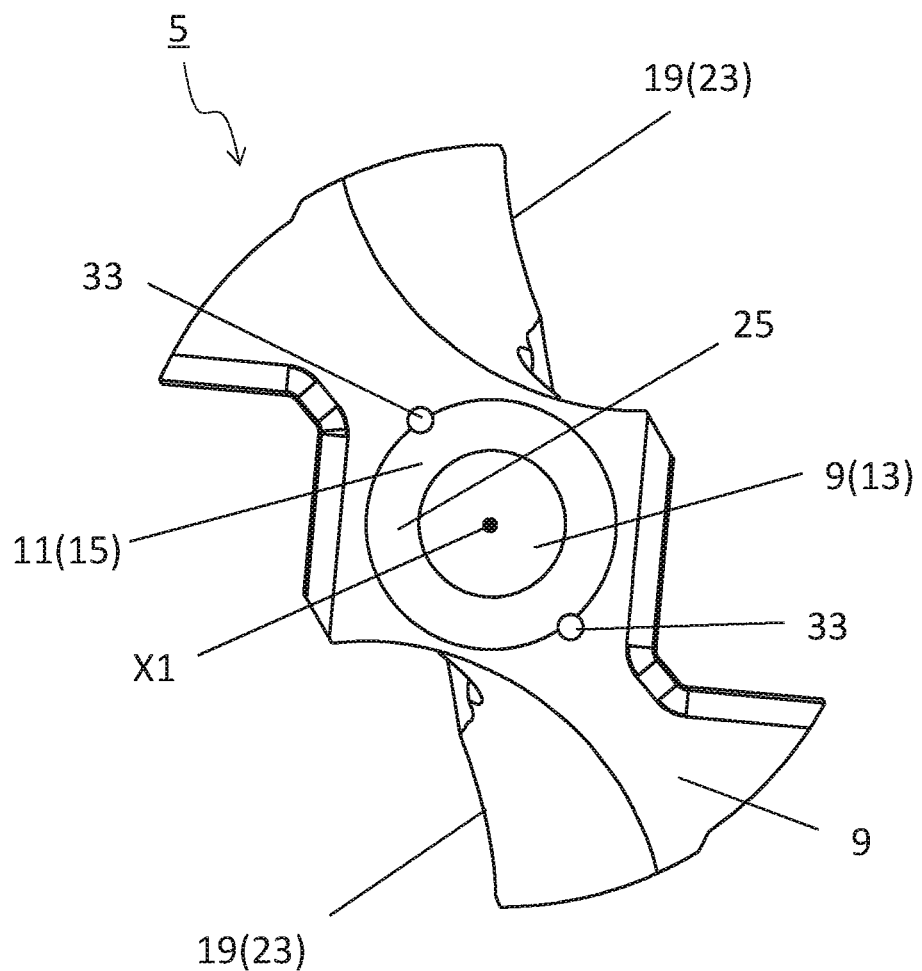
FIG. 16 is a back view of a non-limiting aspect of the disclosure of the tip illustrated in FIG. 7.

No particular limit is imposed on the shape of the engaging portion 15 in the second part 11 and the shape of the recess 25 in the first part 9 if it is possible to increase the joining area of the second part 11 with respect to the first part 9. For example, as illustrated in FIG. 15, an outer periphery of the recess 25 may have a quadrangular shape as viewed from a side of the second end. As illustrated in FIG. 16, the outer periphery of the recess may have a circular shape as viewed from the side of the second end.

A diameter of the engaging portion 15 is constant as viewed from the side of the second end in the non-limiting aspect of the disclosure illustrated in FIG. 16. The diameter of the engaging portion 15 includes a portion including a relatively large length and a portion including a relatively small length as viewed from the side of the second end in the non-limiting aspects of the disclosure illustrated in FIGS. 7 and 15. The drill 1 rotates in X2 direction, and a load in a direction along this rotation direction is also applied to the boundaries between the second part 11 and the first part 9 during a cutting process, such as a drilling process.

Figure 7:
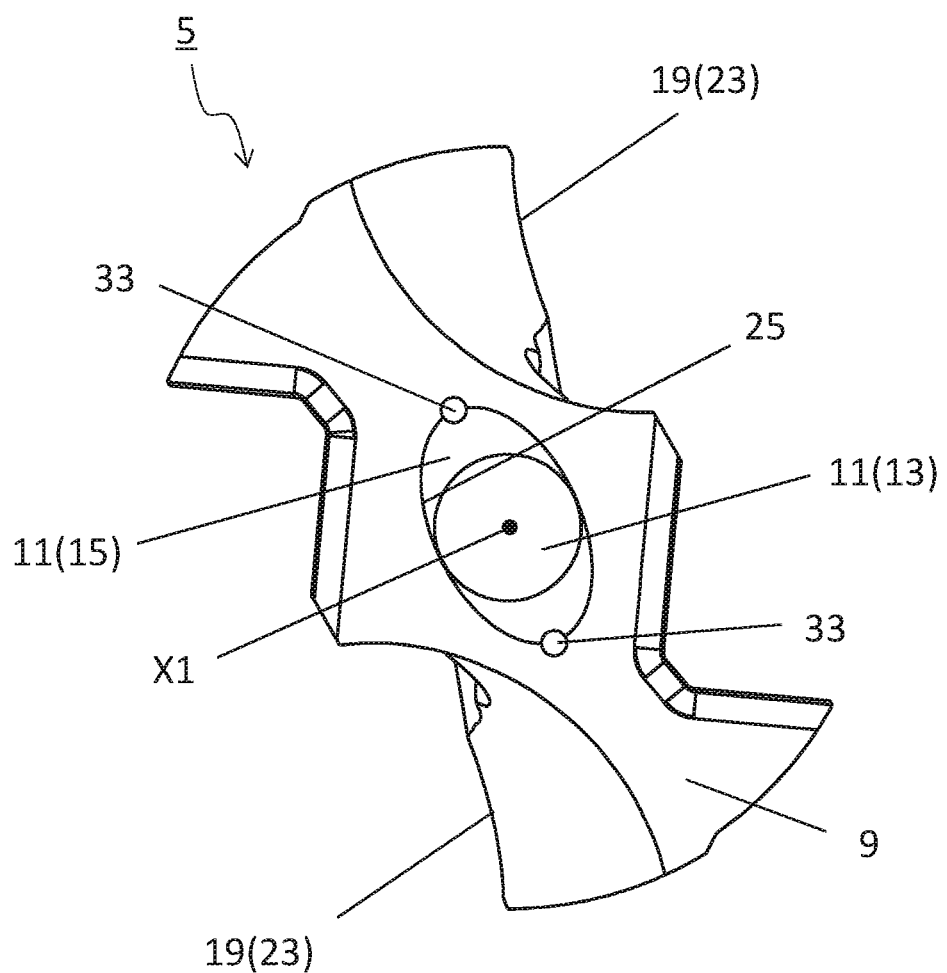
FIG. 7 is a back view as viewed toward a second end of the tip illustrated in FIG. 5.

When the engaging portion 15 includes a portion including a relatively large length and a portion including a relatively small length as in the non-limiting aspects of the disclosure illustrated in FIGS. 7 and 15, the engaging portion 15 and the recess 25 physically support each other with respect to the rotation direction of the drill 1. Because not only chemical bonding force but also the physical support is consequently applied to the boundaries between the second part 11 and the first part 9, cracks are much less likely to occur in these boundaries.

Figure 10:
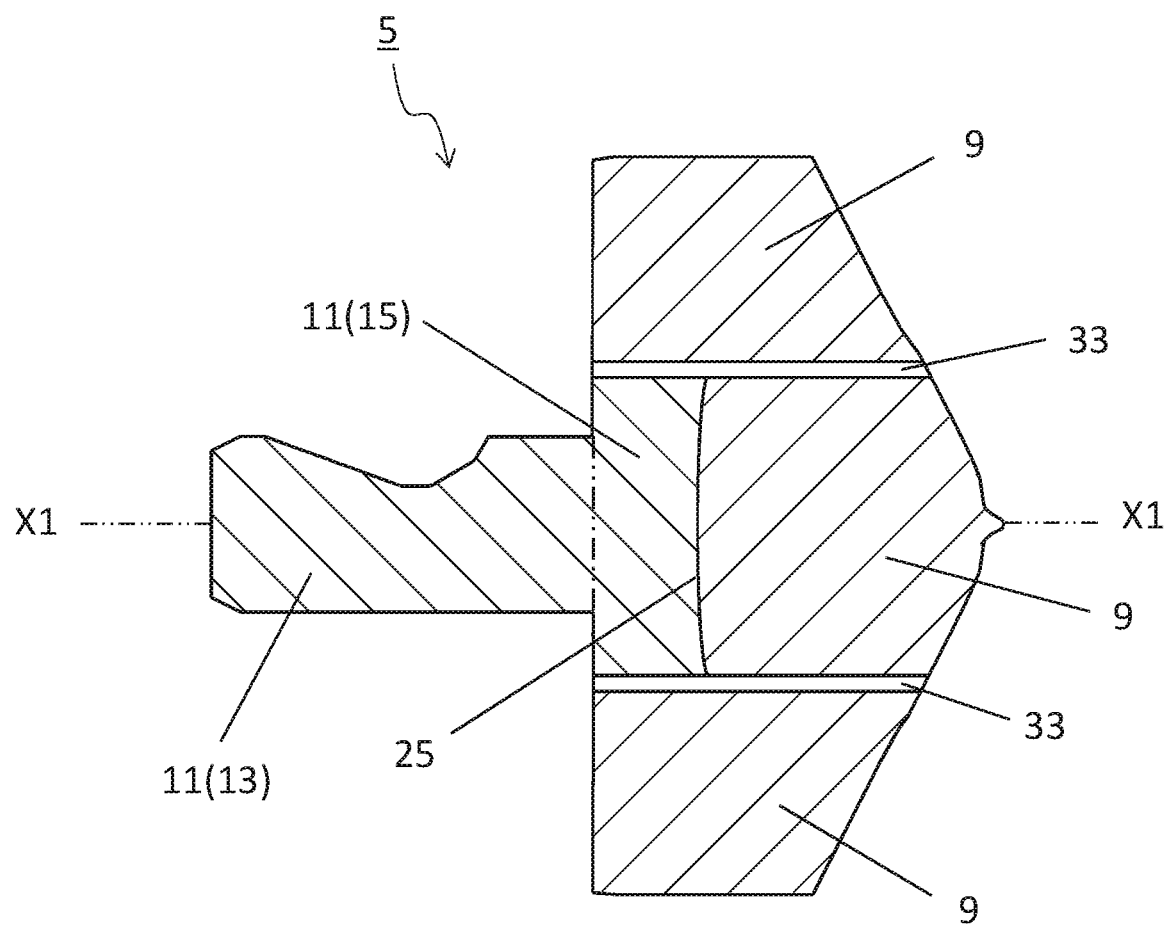
FIG. 10 is a sectional view taken along line B1-B1 in the tip illustrated in FIG. 8.
Figure 11:
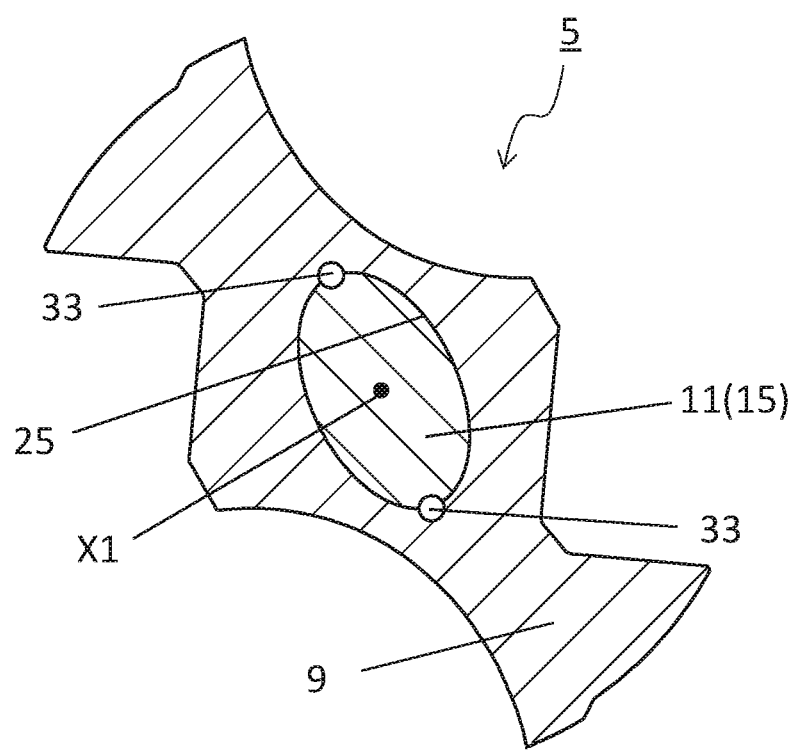
FIG. 11 is a sectional view taken along line B2-B2 in the tip illustrated in FIG. 8.

The end surface at the side of the first end in the engaging portion 15 may have a flat surface shape or alternatively a curved surface shape. When, in opposing surfaces between the recess 25 and the engaging portion 15 which intersect with the central axis X1 as illustrated in FIG. 10 or the like, a side of the recess 25 is a convex curved surface and a side of the engaging portion 15 is a concave curved surface, it is possible to increase the joining area of the second part 11 and the first part 9.

Figure 17:
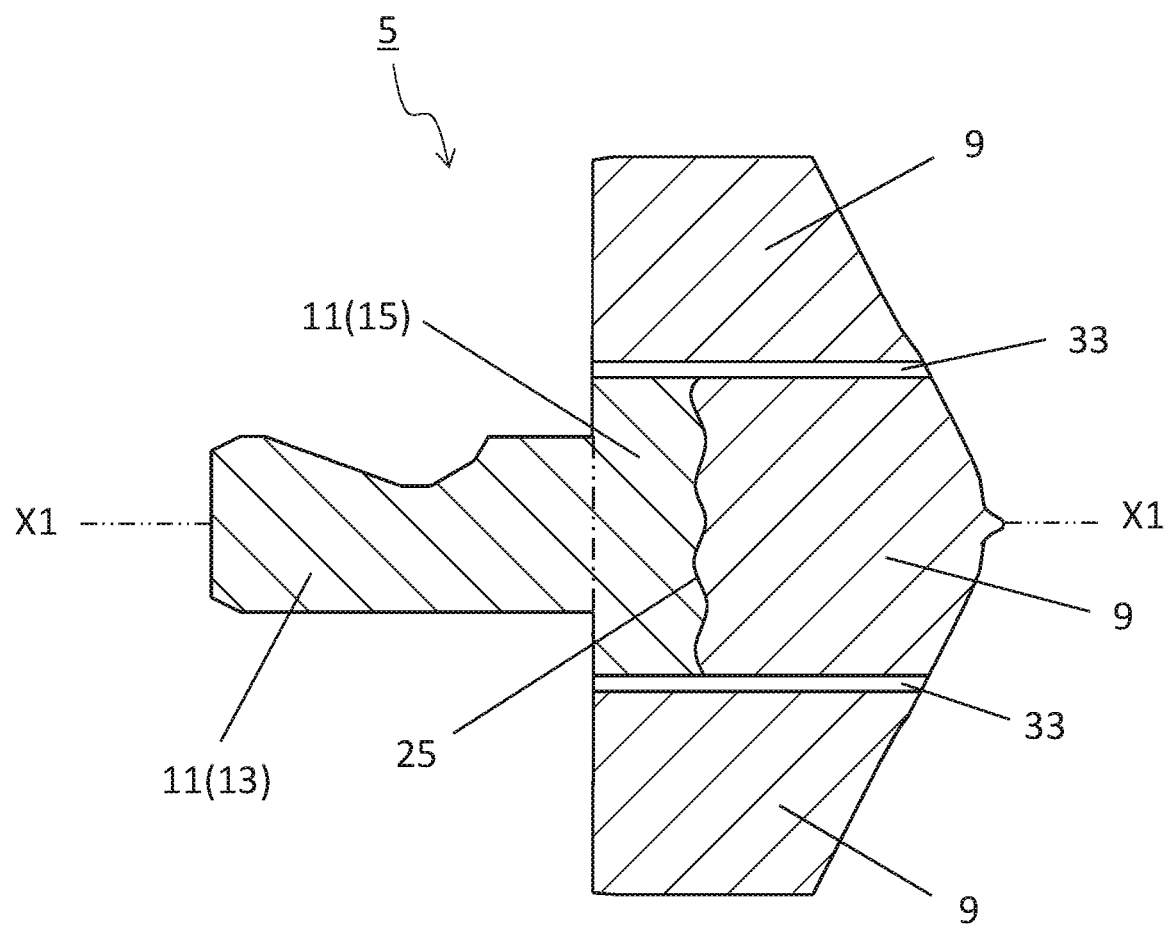
FIG. 17 is a sectional view of a non-limiting aspect of the disclosure of the tip illustrated in FIG. 10.

From the viewpoint of increasing the joining area of the second part 11 and the first part 9, the boundaries between the recess 25 and the engaging portion 15 may have a waveform in the opposing surfaces of the recess 25 and the engaging portion 15 which intersect with the central axis X1 as in the non-limiting aspect of the disclosure illustrated in FIG. 17.

The first part 9 in the present non-limiting aspect of the disclosure is rotationally symmetric with respect to the central axis X1. When the first part 9 includes this configuration, the center of gravity of the first part 9 is located on the central axis X1. It is therefore possible to stably rotate the tip 5 around the central axis X1. The rotation axis X1 of the drill 1 is consequently less likely to deviate during the cutting process, thus leading to the high-accuracy cutting process.

The engaging portion 15 in the present non-limiting aspect of the disclosure is located closer to a side of the second end than the cutting edge 19 in the first part 9. In other words, the entirety of the cutting edge 19 in the first part 9 is located closer to a side of the first end than the engaging portion 15. This makes it possible to ensure a great thickness of a part of the cutting edge 19 in the first part 9 which is located at a side of the second end. It is therefore possible to enhance the durability of the cutting edge 19.

The holder 3 constituting the drill 1 is described in detail below.

Figure 18:
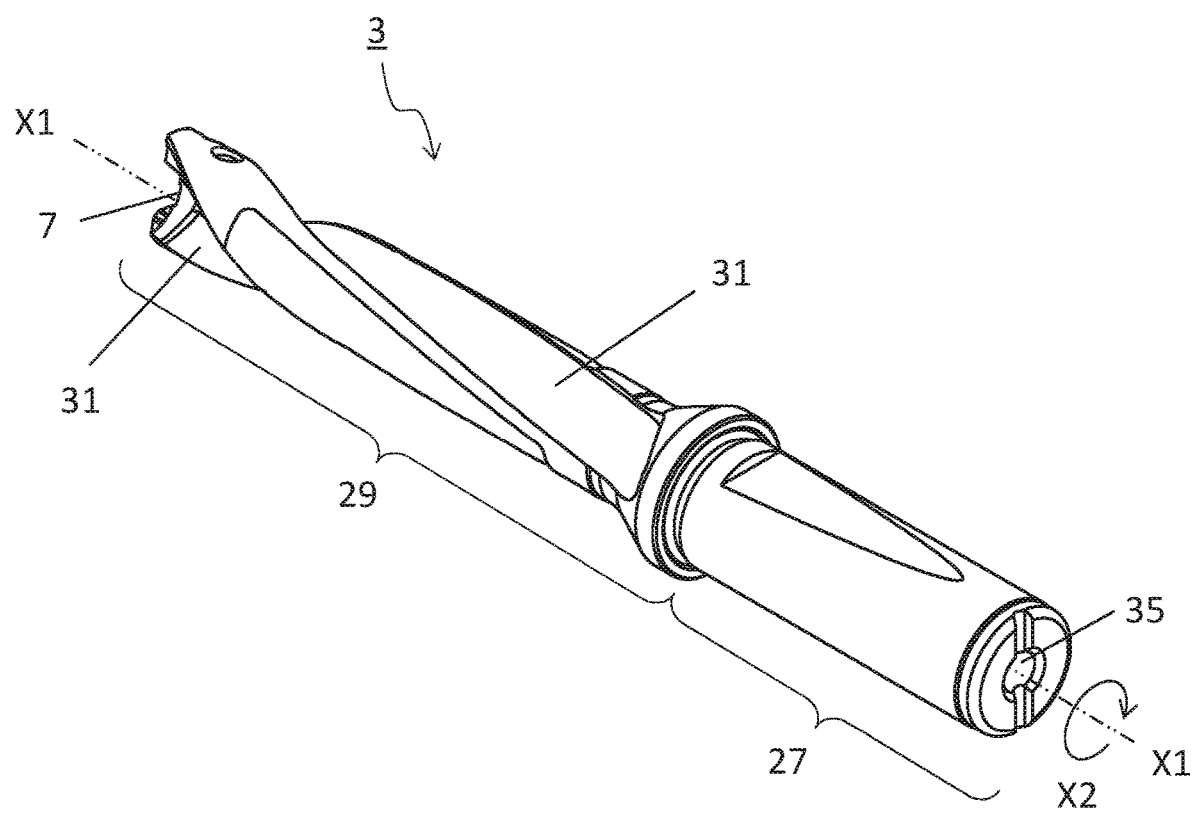
FIG. 18 is a perspective view illustrating a holder in a non-limiting aspect of the disclosure.
Figure 19:
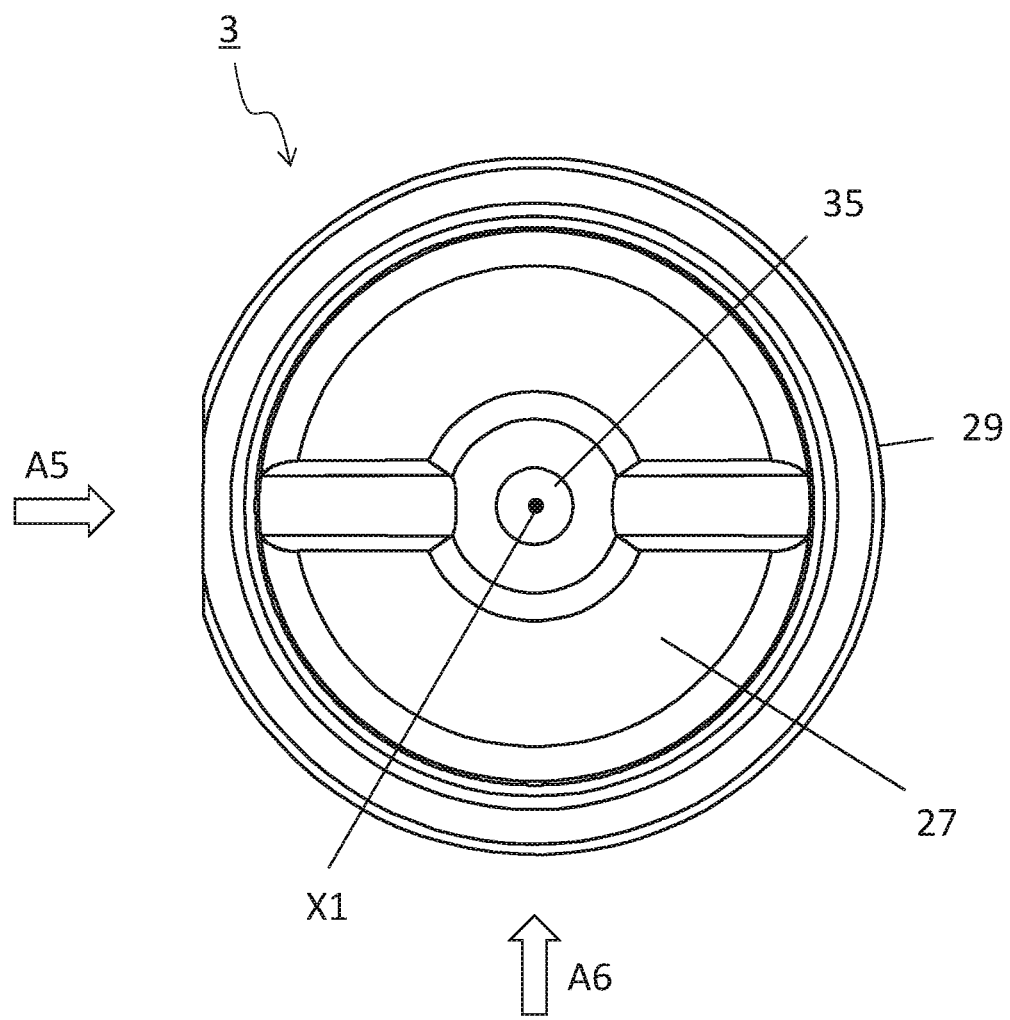
FIG. 19 is a back view as viewed toward a second end of the holder illustrated in FIG. 18.
Figure 20:
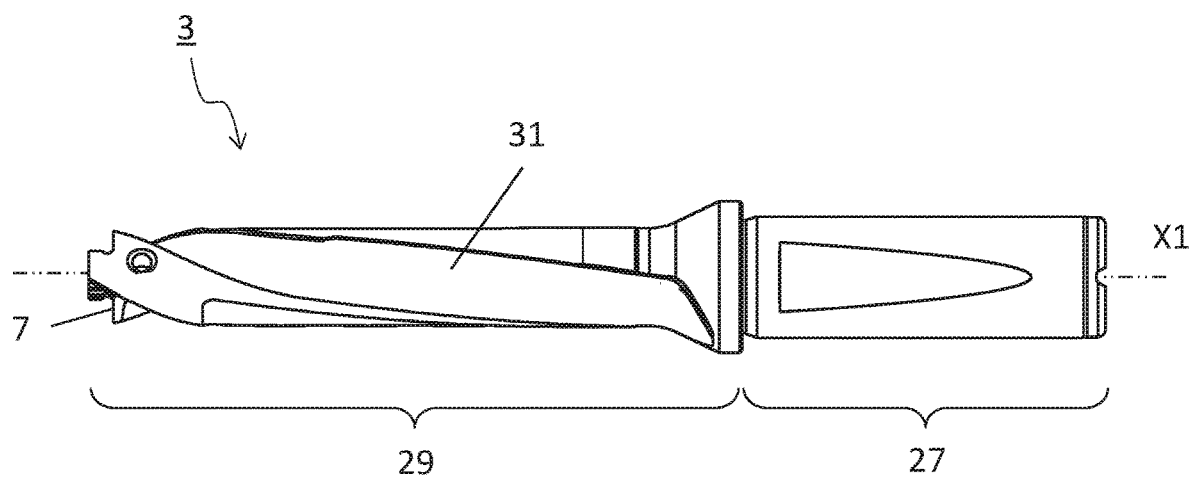
FIG. 20 is a side view when the holder illustrated in FIG. 19 is viewed from A5 direction.
Figure 21:
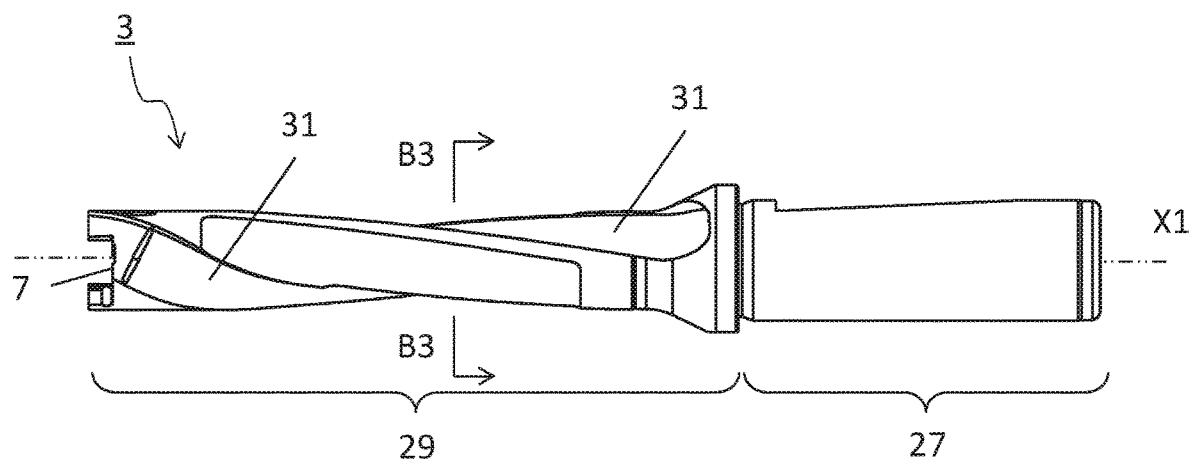
FIG. 21 is a side view when the holder illustrated in FIG. 19 is viewed from A6 direction.

As illustrated in FIG. 18, the holder 3 in the present non-limiting aspect of the disclosure has the bar shape extending along the rotation axis X1, and includes the pocket 7 to which the tip 5 is attached. The holder 3 in the present non-limiting aspect of the disclosure includes a part called a shank 27 and a part called a body 29 located closer to a side of the first end than the shank 27, which are held, for example, by a rotatable spindle of a tool machine that is not particularly illustrated.

As described earlier, the pocket 7 is located at a side of the first end in the holder 3, and the pocket 7 includes a hole. The hole extends along the rotation axis X1 and opens toward a side of the first end. The hole corresponds to the shank portion 13 of the tip 5, and the shank portion 13 is designed to be inserted into the hole.

A pair of flutes 31 are located on an outer periphery of the body 29 in the holder 3. An end portion at a side of the first end in each of the pair of flutes 31 connects to the rake surface in the tip 5, and extends spirally around the rotation axis in a direction toward the shank 27.

The flutes 31 in the present non-limiting aspect of the disclosure are used to discharge chips after flowing along the rake surfaces, to the outside. The pair of flutes are therefore generally called chip discharge flutes (flutes). In order that the holder 3 is stably held by the tool machine, the pair of flutes 31 are formed only in the body 29, while not formed in the shank 27.

Figure 22:
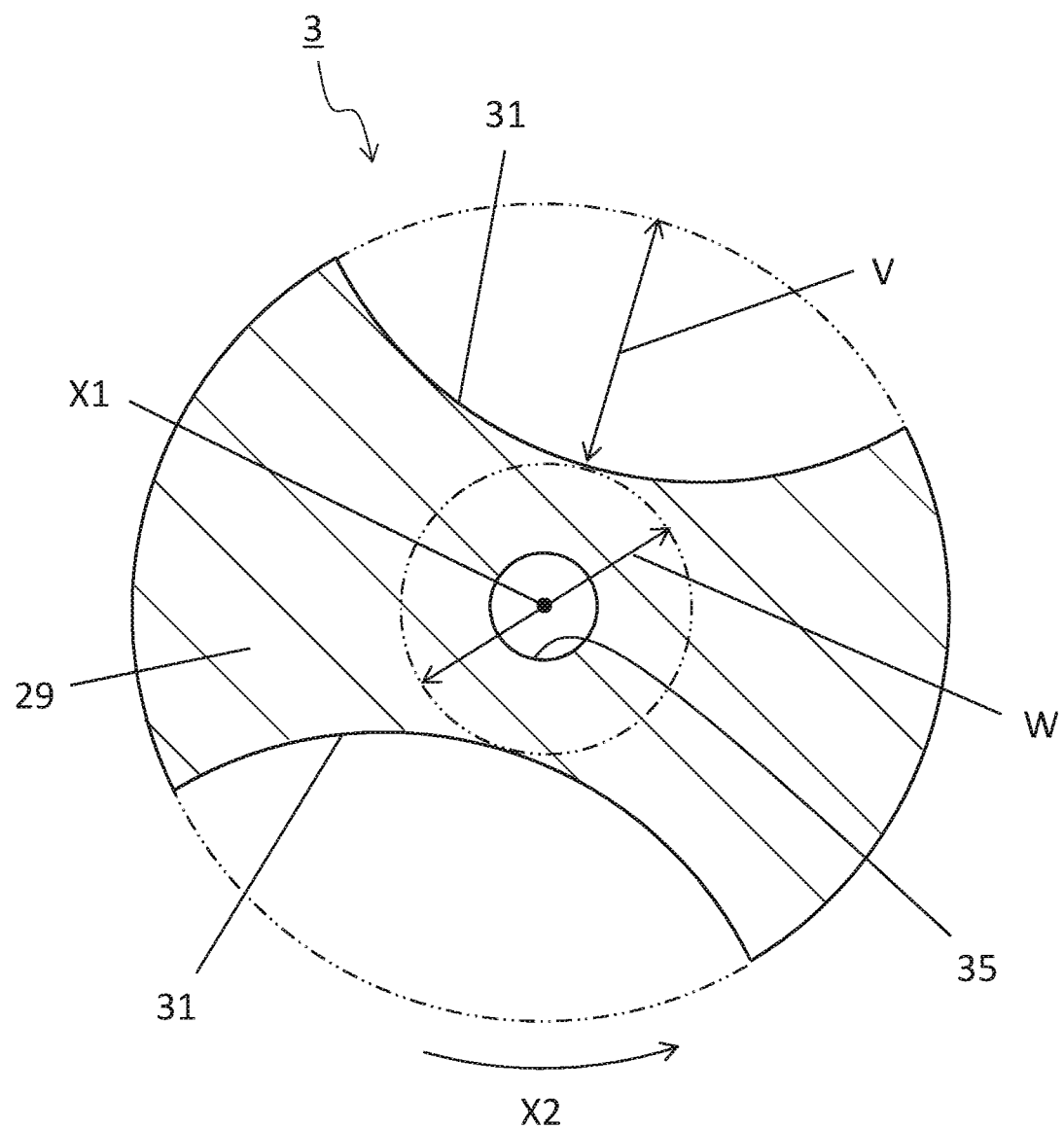
FIG. 22 is a sectional view taken along line B3-B3 in the holder illustrated in FIG. 21.

A depth V of each of the pair of flutes 31 is settable to approximately 10-40% of an outer diameter of the body 29. Here, the depth V of the flutes 31 denotes a value obtained by subtracting a distance between a bottom of each of the flutes 31 and the rotation axis X1 from a radius of the body 29 in a cross section orthogonal to the rotation axis X1 as illustrated in FIG. 22.

Accordingly, a diameter W of a web thickness indicated by a diameter of an inscribed circle (axis) in the cross section orthogonal to the rotation axis X1 in the body 29 is settable to approximately 20-80% of the outer diameter of the body 29. Specifically, for example, when the outer diameter of the body 29 is 20 mm, the depth V of each of the flutes 31 is settable to approximately 2-8 mm.

For example, the outer diameter of the body 29 may be set to 6-42.5 mm in the holder 3 in the present non-limiting aspect of the disclosure. The holder 3 in the present non-limiting aspect of the disclosure may be set, for example, in a range of L=3 D to L=12 D where L is a length of an axial line (length of the body 29), and D is a diameter (outer diameter of the body 29).

Examples of material of the holder 3 include the same ones as in the second part 11 in the tip 5. Specific examples thereof include metal, cemented carbide, and cermet.

The tip 5 in the present non-limiting aspect of the disclosure includes first through holes 33. The holder 3 includes a second through hole 35. Specifically, the tip 5 includes two first through holes 33. Each of the first through holes 33 extends from a side of the first end to a side of the second end in the tip 5. An opening portion at a side of the first end in the first through hole 33 is located on the flank surface in the first part 9. A part of the first through hole 33 which is located at a side of the first end is located in the first part 9, and a part of the first through hole 33 which is located at a side of the second end is located at boundary portion between the first part 9 and the engaging portion 15.

Each of the first through holes 33 in the present non-limiting aspect of the disclosure is composed of a through hole part extending from the recess 25 in the first part 9 toward a side of the first end in the first part 9, and a groove part which connects to the through hole part in the recess 25 and extends toward a side of the second end.

The second through hole 35 extends from a side of the second end to a side of the first end in the holder 3, and includes an opening portion on an end surface at a side of the second end in the holder 3. The second through hole 35 is branched into two at a side of the first end, and two opening portions at a side of the first end are respectively located in the pocket 7. The two opening portions at the side of the first end in the second through hole 35 are respectively connected to the two opening portions at the side of the second end in the first through hole 33.

The first through holes 33 and the second through hole 35 are used to pour a coolant. The coolant supplied from the opening portion at the side of the second end in the second through hole 35 is injected to the outside after passing through the second through hole 35 and the first through holes 33. The coolant is usable for cooling the drill 1 and a workpiece during a cutting process. Particularly in order to cool the cutting edge 19 in the drill 1, the coolant is designed to be injected toward the outside from the flank surface which is located at the side of the first end in the first part 9 and connects to the cutting edge 19.

The first through holes 33 are located away from the shank portion 13 in the second part 11, thus leading to enhanced strength of the shank portion 13. This makes it possible to stably hold the tip 5 by the holder 3.

Although the first through holes 33 may have a straight line shape extending straight from a side of the first end to a side of the second end in the tip 5 as illustrated in FIG. 10 and the like, the first through holes 33 may be configured as illustrated in FIG. 14.

In each of the first through holes 33 illustrated in FIG. 14, the above-mentioned groove part has such a configuration that an end portion at a side of the first end is located closer to the central axis X1 than an end portion at a side of the second end. More specifically, the groove part comes closer to the central axis X1 as going toward the side of the first end, and the above-mentioned through hole part in each of the first through holes 33 extends along the central axis X1.

A part of the cutting edge 19 which is close to the central axis X1 needs to be more especially cooled than a part of the cutting edge 19 which is away from the central axis X1. When the groove part in each of the first through holes 33 is designed to be inclined relative to the central axis as described above, the opening portion at the side of the first end in the first through hole 33 can be closer to the central axis X1. Also, when the through hole part in the first through hole 33 extends parallel to the central axis X1 as described above, the coolant can be stably injected in a direction along the central axis X1.

Figure 23:
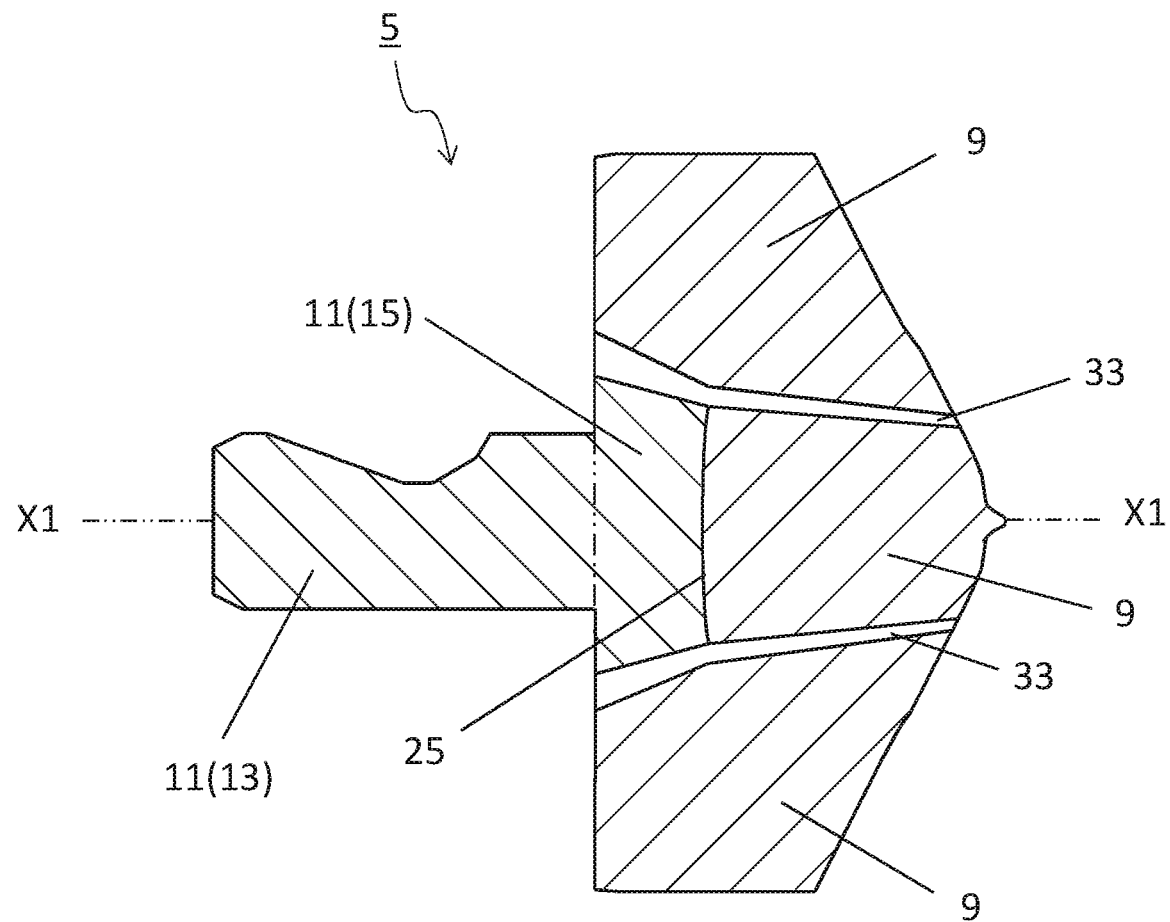
FIG. 23 is a sectional view of a non-limiting aspect of the disclosure of the tip illustrated in FIG. 10.

When it is particularly necessary to cool, for example, the first cutting edge 21 in the cutting edge 19, the first through holes 33 may be configured as in an non-limiting aspect of the disclosure illustrated in FIG. 23. In the non-limiting aspect of the disclosure illustrated in FIG. 23, groove parts in the first through holes 33 have the same configuration as the groove parts illustrated in FIG. 14, and the through hole part in each of the first through holes 33 also extends along the central axis X1 as going toward the side of the first end. When the first through holes 33 are configured as in the non-limiting aspect of the disclosure illustrated in FIG. 23, it becomes easier to inject the coolant toward the central axis X1. It is therefore possible to efficiently cool the first cutting edge 21 that intersects with the central axis X1.

An inner diameter of each of the first through holes 33 may be constant from a side of the first end to a side of the second end in the tip 5. Alternatively, as illustrated in FIG. 23, an inner diameter of the first through hole 33 at a side of the first end of the tip 5 (an opening portion on a right side in FIG. 23) may be smaller than an inner diameter of the first through hole 33 at a side of the second end of the tip 5 (an opening portion on a left side in FIG. 23).

When the inner diameter of the first through hole 33 is configured as illustrated in FIG. 23, it is possible to enhance cooling efficiency with the coolant. Specifically, the coolant can be stably supplied into the first through holes 33 because the inner diameter at the side of the second end of the tip 5 is relatively great. An injection pressure of the coolant can be enhanced because the inner diameter at the side of the first end of the tip 5 is relatively small. Therefore, it becomes easier to stably inject the coolant in a desired direction.

<Method of Manufacturing Machined Product>

A method of manufacturing a machined product in a non-limiting aspect of the disclosure is described in detail below by exemplifying the case of using the drill 1 in the foregoing aspects of the disclosure. The method is described below with reference to FIGS. 24 to 26.

The method of manufacturing a machined product in the present non-limiting aspect of the disclosure includes the following steps (1) to (4).

Figure 24:
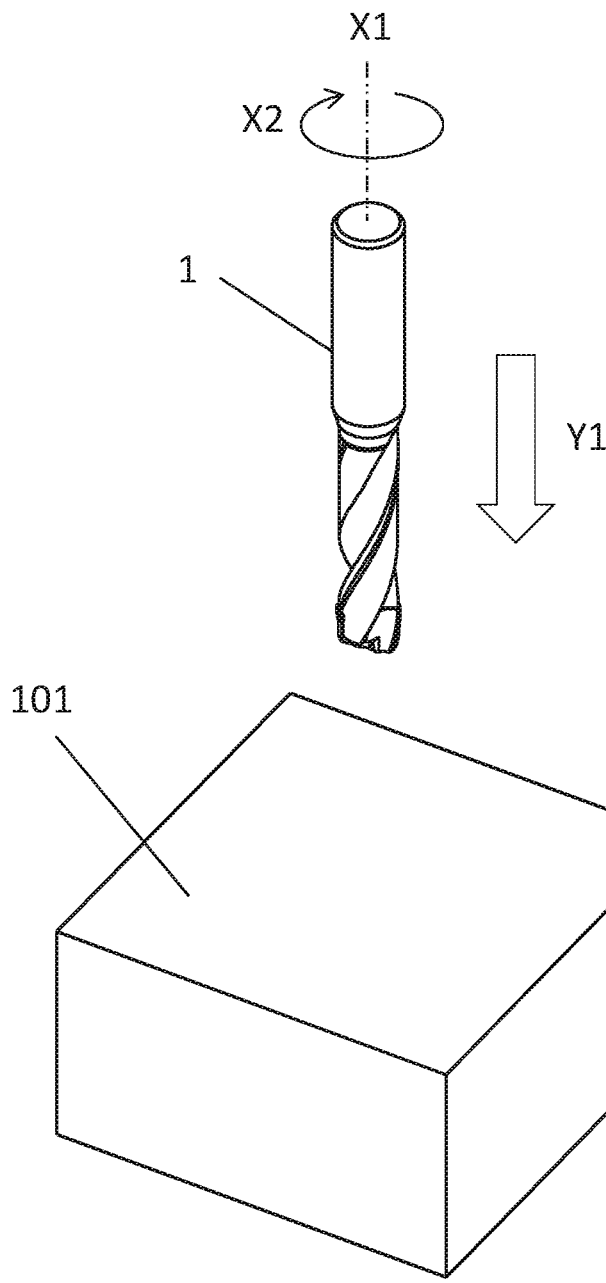
FIG. 24 is a schematic diagram illustrating a step in a method of manufacturing a machined product in a non-limiting aspect of the disclosure.

(1) The step is to dispose the drill 1 above a prepared workpiece 101 (refer to FIG. 24).

Figure 25:
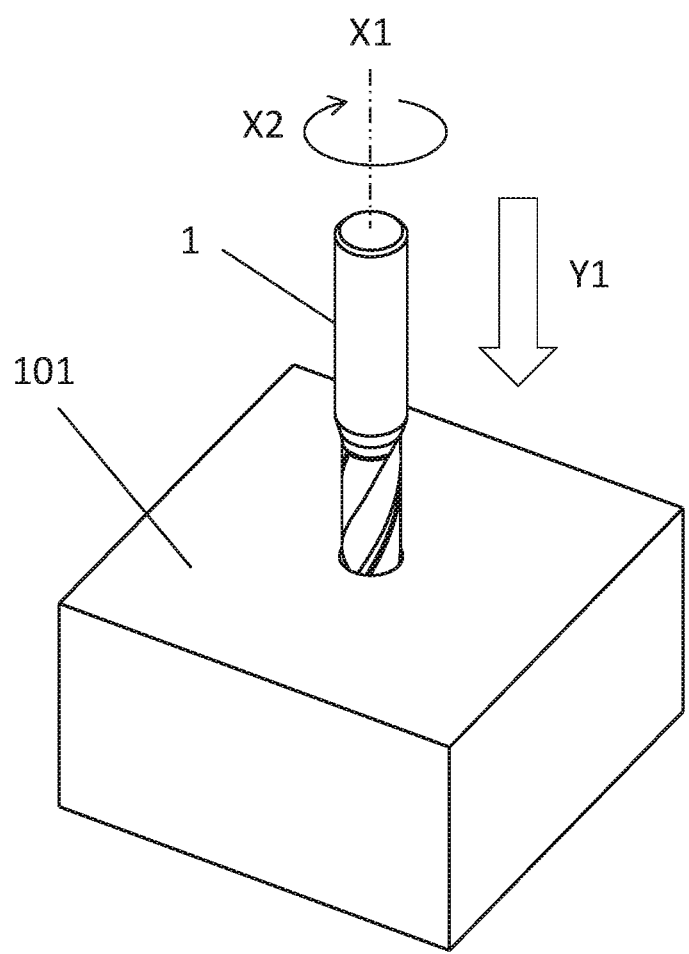
FIG. 25 is a schematic diagram illustrating a step in a method of manufacturing a machined product in a non-limiting aspect of the disclosure.

(2) The step is to bring the drill 1 near the workpiece 101 in Y1 direction while rotating the drill 1 in an arrow X2 direction around the rotation axis X1 (refer to FIGS. 24 and 25).

This step may be carried out, for example, by fixing the workpiece 101 onto a table of a machine tool including the drill 1 attached thereto, and then by bringing the drill 1 being rotated near the workpiece 101. In this step, the workpiece 101 and the drill 1 need to be brought near each other. For example, the workpiece 101 may be brought near the drill 1.

(3) The step is to form a drilled hole (through hole) in the workpiece 101 by bringing the drill 1 nearer the workpiece 101 so that the cutting edge of the drill 1 being rotated comes into contact with a desired position on a surface of the workpiece 101 (refer to FIG. 25).

From the viewpoint of obtaining a good machined surface, it may be preferable to make a setting in this step so that a partial region at a side of the second end of the body in the holder does not penetrate the workpiece 101 in a non-limiting aspect of the disclosure. That is, excellent chip discharge performance is attainable via the partial region by making the partial region function as a margin region for discharging chips.

Figure 26:
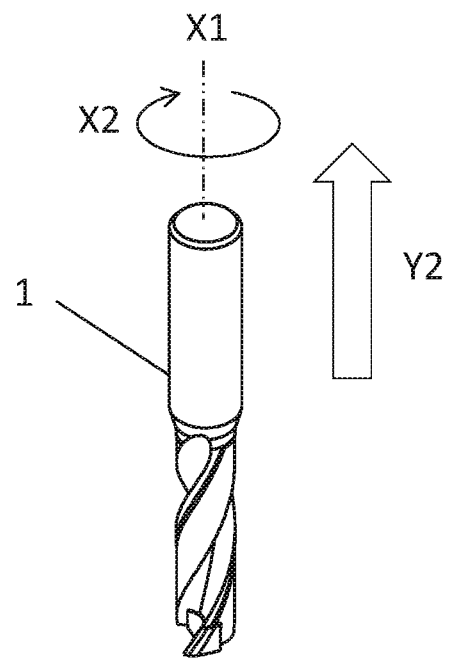
FIG. 26 is a schematic diagram illustrating a step in a method of manufacturing a machined product in a non-limiting aspect of the disclosure.
Figure 26:
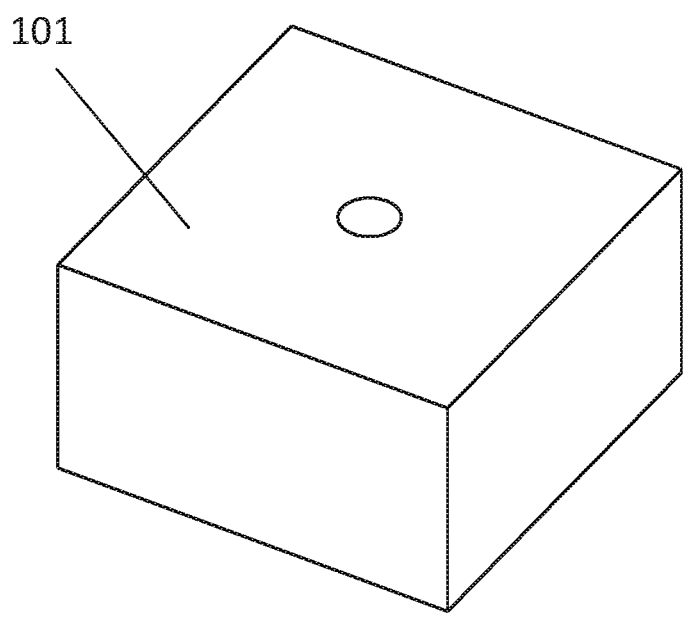

(4) The step is to move the drill 1 away from the workpiece 101 in Y2 direction (refer to FIG. 26).

Also in this step, the workpiece 101 and the drill 1 need to be kept away from each other as is the case with the above step (2). For example, the workpiece 101 may be moved away from the drill 1.

Excellent drilling performance is attainable through the foregoing steps.

When the cutting process of the workpiece 101 as described above is carried out a plurality of times, specifically, for example, when a plurality of drilled holes are formed in the single workpiece 101, it is necessary to repeat the step of bringing the cutting edge of the drill 1 into contact with different portions of the workpiece 101 while keeping the drill 1 rotating.

While the drills 1 in the several embodiments have been described and illustrated above, the present invention is not limited thereto. It is, of course, possible to make any arbitrary ones insofar as they do not depart from the gist of the present invention.

DESCRIPTION OF REFERENCE NUMERALS 1 drill
3 holder
5 tip (for drill)
7 pocket
9 first part
11 second part
13 shank portion
15 engaging portion
19 cutting edge
21 first cutting edge
23 second cutting edge
25 recess
27 shank
29 body
31 flute
33 first through hole
35 second through hole
101 workpiece

What is claimed is:

1. A drill tip, comprising:
a first part comprising a cutting edge located at a side of a first end, and a recess located at a side of a second end, where the first end is one side of a central axis and the second end is another side of the central axis; and
a second part comprising a shank portion extending along the central axis, and an engaging portion which connects to the shank portion at a side of the first end and comprises a diameter greater than the shank portion, wherein
the engaging portion is located in the recess,
the first part comprises a through hole extending from the recess toward a side of the first end, and
the recess comprises a groove which connects to the through hole and extends toward a side of the second end.

2. The drill tip according to claim 1,
wherein an inner diameter of a part of the recess which is located at a side of the second end is smaller than an outer diameter of the engaging portion.

3. The drill tip according to claim 1,
wherein a side of the recess is a convex curved surface and a side of the engaging portion is a concave curved surface in opposing surfaces between the recess and the engaging portion which intersect with the central axis.

4. The drill tip according to claim 1,
wherein the first part is rotationally symmetric with respect to the central axis.

5. The drill tip according to claim 1,
wherein the engaging portion is located closer to a side of the second end than the cutting edge.

6. The drill tip according to claim 1,
wherein an end portion of the groove located at a side of the first end is located closer to the central axis than an end portion of the groove located at a side of the second end.

7. The drill tip according to claim 1,
wherein the second part is joined to the first part.

8. A drill, comprising:
the drill tip according to claim 1; and a holder comprising a pocket at a side of the first end, and the pocket at which the drill tip is located.

* * * * *